(12) United States Patent
Liniado et al.

(10) Patent No.: US 10,893,364 B2
(45) Date of Patent: Jan. 12, 2021

(54) EXPANDABLE SPEAKER SYSTEMS

(71) Applicant: DGL Group, Edison, NJ (US)

(72) Inventors: Marc Liniado, Brooklyn, NY (US); Andrew Kohlsmith, Toronto (CA)

(73) Assignee: DGL GROUP LTD., Edison, NJ (US)

( * ) Notice: Subject to any disclaimer, the term of this patent is extended or adjusted under 35 U.S.C. 154(b) by 0 days.

(21) Appl. No.: 16/719,450

(22) Filed: Dec. 18, 2019

(65) Prior Publication Data

US 2020/0128328 A1 Apr. 23, 2020

Related U.S. Application Data

(63) Continuation-in-part of application No. 16/243,222, filed on Jan. 9, 2019.

(60) Provisional application No. 62/615,038, filed on Jan. 9, 2018.

(51) Int. Cl.
| | | |
|---|---|---|
| *H04R 5/02* | (2006.01) | |
| *H04R 5/04* | (2006.01) | |
| *H04R 1/02* | (2006.01) | |
| *H04S 3/00* | (2006.01) | |
| *G06F 3/16* | (2006.01) | |

(52) U.S. Cl.
CPC ............. *H04R 5/02* (2013.01); *G06F 3/165* (2013.01); *H04R 1/025* (2013.01); *H04R 5/04* (2013.01); *H04S 3/008* (2013.01); *H04R 2420/07* (2013.01); *H04S 2400/13* (2013.01)

(58) Field of Classification Search
CPC . H04R 5/02; H04R 1/025; H04R 5/04; H04R 2420/07; H04R 2430/01
See application file for complete search history.

(56) References Cited

U.S. PATENT DOCUMENTS

| | | | |
|---|---|---|---|
| 8,483,757 B2 | 7/2013 | Bodley et al. | |
| 8,638,957 B2 | 1/2014 | Sim et al. | |
| 9,294,840 B1 | 3/2016 | Anderson et al. | |
| 9,883,265 B2 | 1/2018 | Cheney et al. | |
| 10,111,003 B2 | 10/2018 | Ang et al. | |
| 2011/0286613 A1 | 11/2011 | Lipsky et al. | |
| 2015/0049895 A1 | 2/2015 | Walter et al. | |

(Continued)

FOREIGN PATENT DOCUMENTS

KR 10-1641510 7/2016

OTHER PUBLICATIONS

Non Final Office Action issued for corresponding U.S. Appl. No. 16/243,222 dated Oct. 31, 2019.

(Continued)

*Primary Examiner* — David L Ton
(74) *Attorney, Agent, or Firm* — Myers Wolin, LLC

(57) ABSTRACT

A speaker system is provided having a primary speaker module configured to communicate with an external audio device and having a speaker output face and a back surface, and a secondary speaker module in signal communication with the primary speaker module and having a speaker output face and a back surface. The primary speaker module and the secondary speaker module combine in at least two configurations, a first configuration in which the primary speaker module and the secondary speaker module are connected at their back surfaces and their respective speaker output faces face opposite directions, and a second configuration in which the primary speaker module and the secondary speaker module are side by side and their respective speaker output faces face substantially the same direction.

20 Claims, 26 Drawing Sheets

(56) References Cited

U.S. PATENT DOCUMENTS

2015/0287419 A1    10/2015    Chen et al.
2016/0150320 A1     5/2016    Hetke et al.

OTHER PUBLICATIONS

HUB | The first Hi-Fi, Wi-Fi hub for headphones and speakers by ekko audio, LLC.—Kickstarter; https://www.kickstarter.com/projects/ekkowifi/hub-by-ekko-the-first-hi-fi-wi-fi-hub-for-headphon; Nov. 15, 2018.

International Search Report (including Translated Abstract of KR10-1641510); corresponding PCT Application Serial No. PCT/US2019/012816, International Filing Date Jan. 9, 2019; Authorized Officer Min Jeong Kang; dated Apr. 30, 2019.

Written Opinion; corresponding PCT Application Serial No. PCT/US2019/012816, International Filing Date Jan. 9, 2019, Authorized Officer Min Jeong Kang; dated Apr. 30, 2019.

EXPANDABLE SPEAKER SYSTEMS

CROSS-REFERENCE TO RELATED APPLICATION

The present application is a continuation in part of U.S. patent application Ser. No. 16/243,222, filed Jan. 9, 2019, which claims the benefit of U.S. Provisional Patent Application No. 62/615,038 filed on Jan. 9, 2018. The entire contents of each of these disclosures are hereby expressly incorporated by reference in their entirety.

FIELD OF INVENTION

The present disclosure is directed to an expandable wireless speaker system. More particularly, the present disclosure is directed to a speaker system and method of wirelessly communicating with at least one or more remote speakers to broadcast audio information from a connected device.

BACKGROUND

Audio systems include an audio source, such as a receiver, phone, computer, television, or other A/V device in communication with one or more speakers. The audio source may be communication with the speakers through a wired connection or by wireless communication means. Current systems and methods for wirelessly broadcasting and playing audio utilize Bluetooth or other wireless communication protocols. However, such wireless communication protocols do not allow for real-time audio listening and introduce a delay to be used with video to allow the sound to catch up. Additionally, current wireless systems may transmit audio from a device to a single receiver. This does not allow for surround sound or expandable systems.

SUMMARY OF THE INVENTION

A speaker system is provided having a primary speaker module configured to communicate with an external audio device and having a speaker output face and a back surface, and a secondary speaker module in signal communication with the primary speaker module and having a speaker output face and a back surface. The primary speaker module and the secondary speaker module combine in at least two configurations, a first configuration in which the primary speaker module and the secondary speaker module are connected at their back surfaces and their respective speaker output faces face opposite directions, and a second configuration in which the primary speaker module and the secondary speaker module are side by side and their respective speaker output faces face substantially the same direction.

When the primary speaker module and the secondary speaker module are in the first configuration, each speaker module outputs full sound, and when the primary speaker module and the secondary speaker module are in the second configuration, a first of the speaker modules outputs left stereo sound and a second of the speaker modules outputs right stereo sound.

In some embodiments, the primary speaker module has a first connector on its back surface for connecting the primary speaker module to the secondary speaker module in the first configuration and a second connector on a side surface for connecting the primary speaker module to the secondary speaker module in the second configuration.

The speaker system may further comprise a plurality of tertiary speaker modules, wherein the tertiary speaker modules are each attached to the primary speaker module or the at least one secondary speaker module in the first configuration, and wherein the tertiary speaker modules are in wireless signal communication with the primary speaker module in the second configuration. In such an embodiment, when in the first configuration, the tertiary speaker modules each outputs full sound, and in the second configuration, the tertiary speaker modules each provide an audio channel for a surround sound system other than the left stereo and right stereo channels.

Where tertiary speaker modules are included, one of the tertiary speaker modules connects to the primary speaker module by way of the second connector when in the first configuration. In the first configuration, the tertiary speaker modules face opposite directions and are each at a substantially right angle relative to the primary speaker module and the secondary speaker module, such that speaker modules in the first configuration face at least four distinct directions.

In some embodiments, the speaker system contains quaternary speaker modules attached to the tertiary speaker modules in the first configuration, and in wireless communication with the primary speaker module in the second configuration. As in the case of the tertiary speaker modules, when in the first configuration, each of the quaternary speaker modules outputs full sound, and when in the second configuration, each of the quaternary speaker modules outputs a channel of a surround sound system other than the left stereo and right stereo channels.

In some embodiments, the connectors are magnetic connectors. In some embodiments, in the second configuration, the primary speaker module and the secondary speaker module are spaced apart from each other.

The primary speaker module may communicate with an external audio device by way of a wireless connection or a line in connection. The primary speaker module typically has audio controls and controls the secondary, and when present, tertiary, and quaternary speaker modules. The secondary, tertiary, and quaternary modules may therefore not have audio controls.

Each speaker module may have an internal battery and the connectors may comprise electrical connections, such that one speaker module, such as the primary speaker module, may be plugged in, and the secondary, and where present, tertiary, and quaternary speaker modules may be charged by way of the connectors. In some embodiments, the primary and secondary speaker modules comprise a subwoofer component.

A method for broadcasting audio through a speaker system is also provided in which the system receives a signal communication from an external audio device at a primary speaker module and determines if the speaker system is in a first or second of two configurations. If the speaker system is determined to be in the first configuration, the primary speaker module transmits whole audio to a secondary speaker module and outputs the whole audio at the primary speaker module.

If the speaker system is determined to be in the second configuration, the primary speaker module transmits one of left stereo or right stereo audio to the secondary speaker module, and outputs the other of left stereo or right stereo audio at the primary speaker module. As discussed with respect to the system itself, when the first configuration comprises the primary speaker module and the secondary speaker module are positioned back to back and facing opposite directions.

In systems where tertiary and/or quaternary speakers are provided, the system determines if it is in the first or second configuration, and if in the first configuration, transmits whole audio to all speakers. If in the second configuration, the system transmits distinct audio channels to each of the speaker modules.

Also provided is a speaker module comprising a power button, volume controls, a first connector, a second connector, a front surface containing a speaker output, and a transceiver configured to pair the speaker module with an external device to receive audio. The speaker module further comprises an output module for broadcasting audio received from the device. The first connector is on a back surface opposite the front surface and the second connector is on a side surface adjacent the front surface.

Typically, the output module broadcasts audio from the speaker module to a secondary speaker module, and the secondary speaker module is connected to the first connector in a first configuration, and the secondary speaker is connected to the second connector or is connected only wirelessly in a second configuration. In the first configuration, the speaker module outputs full sound, and in the second configuration, the speaker module outputs one of left and right stereo sound and the output module broadcasts the other of left and right stereo sound. In some embodiments, the transceiver is configured to scan for an external device, and the external device broadcasts audio received at the transceiver.

In some embodiments, a speaker system is provided comprising a primary speaker module having a housing, a speaker component within the housing, a storage location within the housing, an output module for broadcasting audio, and a plurality of secondary speaker modules configured to be removably located within the storage location, each of the plurality of secondary speaker modules comprising an input module for receiving audio broadcasted from the output module of the primary speaker module.

The housing typically has a back wall, side walls, and an open front face, and the secondary speaker modules are removable from the housing by way of the open front face. The speaker component of the primary speaker module may be located at a central location within the housing, such that the secondary speaker modules surround the speaker component when located in the storage location.

The secondary speaker modules may be four secondary speaker modules, and each such module may be substantially rectangular with an arcuate segment removed from a corner. In such an embodiment, the arcuate segments of each of the four secondary speaker modules form a circle when the secondary speaker modules are in the storage location, with the circle surrounding the speaker component of the primary speaker module.

The storage location may be divided to provide distinct storage compartments for each of the secondary speaker modules.

In some embodiments, the speaker component within the housing is a subwoofer, while the secondary speaker modules are standard speakers. In other embodiments, the speaker component may include both one or more speaker and a subwoofer or just speakers.

In some embodiments, the secondary speaker modules may comprise support elements for spacing the speaker module apart from the ground or angling the speaker module relative to the ground when separated from the primary speaker module. Such support elements may be collapsible, such that when the support element is stored within the corresponding secondary speaker module, the secondary speaker module may be stored within the storage location. The support element may be, for example, one or more legs.

For example, four legs may be provided, and each leg may be provided with a storage compartment within the corresponding secondary speaker module.

The primary speaker module may further comprise a control interface, and the control interface controls each of the secondary speaker modules. The primary speaker module may further comprise an audio receiving module for receiving audio from an external audio source. This may be a line in connection, a radio broadcast receiver module, and/or a wireless connection.

In some embodiments, the output module transmits distinct audio components to be received at the input module of distinct secondary speaker modules, the distinct audio components being left or right stereo components or channels of surround sound audio.

In some embodiments, the storage location within the housing has electrical contact elements, and wherein each of the secondary speaker modules has a corresponding battery, and wherein the battery of each of the secondary speaker modules is charged by way of the electrical contact elements when the secondary speaker modules are located within the storage location.

In some embodiments, the speaker system has a first configuration in which the secondary speaker modules are located within the storage location and a second configuration in which the secondary speaker modules are removed from the storage location, and wherein in the first configuration, the secondary speaker modules output identical audio components, and wherein in the second configuration, the secondary speaker modules each output distinct audio components

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The disclosure is described in the context of utilizing FM radio transmissions and wireless communication bands with one way communication.

Figure 1:
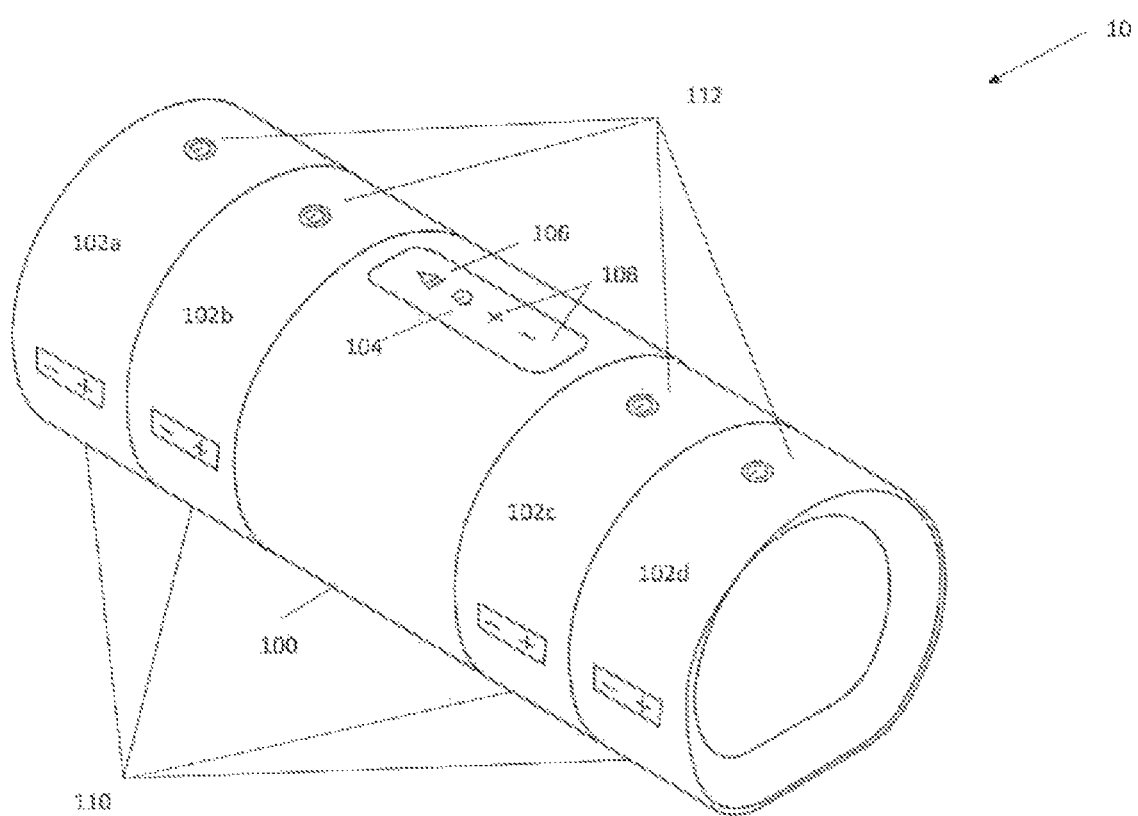
FIG. 1 illustrates one embodiment of a speaker system with a center module and speakers attached.

FIG. 1 illustrates a perspective view of one embodiment of a speaker system 10. The system 10 includes two main elements, a center module 100 and four expandable speakers 102a, 102b, 102c, 102d.

The center module 100 and speakers 102a, 102b, 102c, 102d are attached for transportation purposes. In one embodiment, the speakers 102a, 102b, 102c, 102d and center module 100 are attached using a magnetic connection. In another embodiment, the speakers 102a, 102b, 102c, 102d and center module 100 are attached using a snap mechanism. In yet another embodiment, the speakers 102a, 102b, 102c, 102d and center module 100 are attached by sliding the speakers 102a, 102b, 102c, 102d and/or center module 100 utilizing an interlocking connection.

As the system 10 is intended to be expandable and remote, the center module 100 has its own power control button 104, audio control button 106, and volume control buttons 108, and the speakers 102a, 102b, 102c, 102d each have their own power button 112 and volume controls 110 allowing each unit to have individual control of sound levels and power. In another embodiment, less than four speakers can be utilized in the system or additional speakers can be added to the ends of the existing speaker system 10. In yet another embodiment, the center module 100 and speakers 102a, 102b, 102c, 102d are waterproof.

Figure 2:
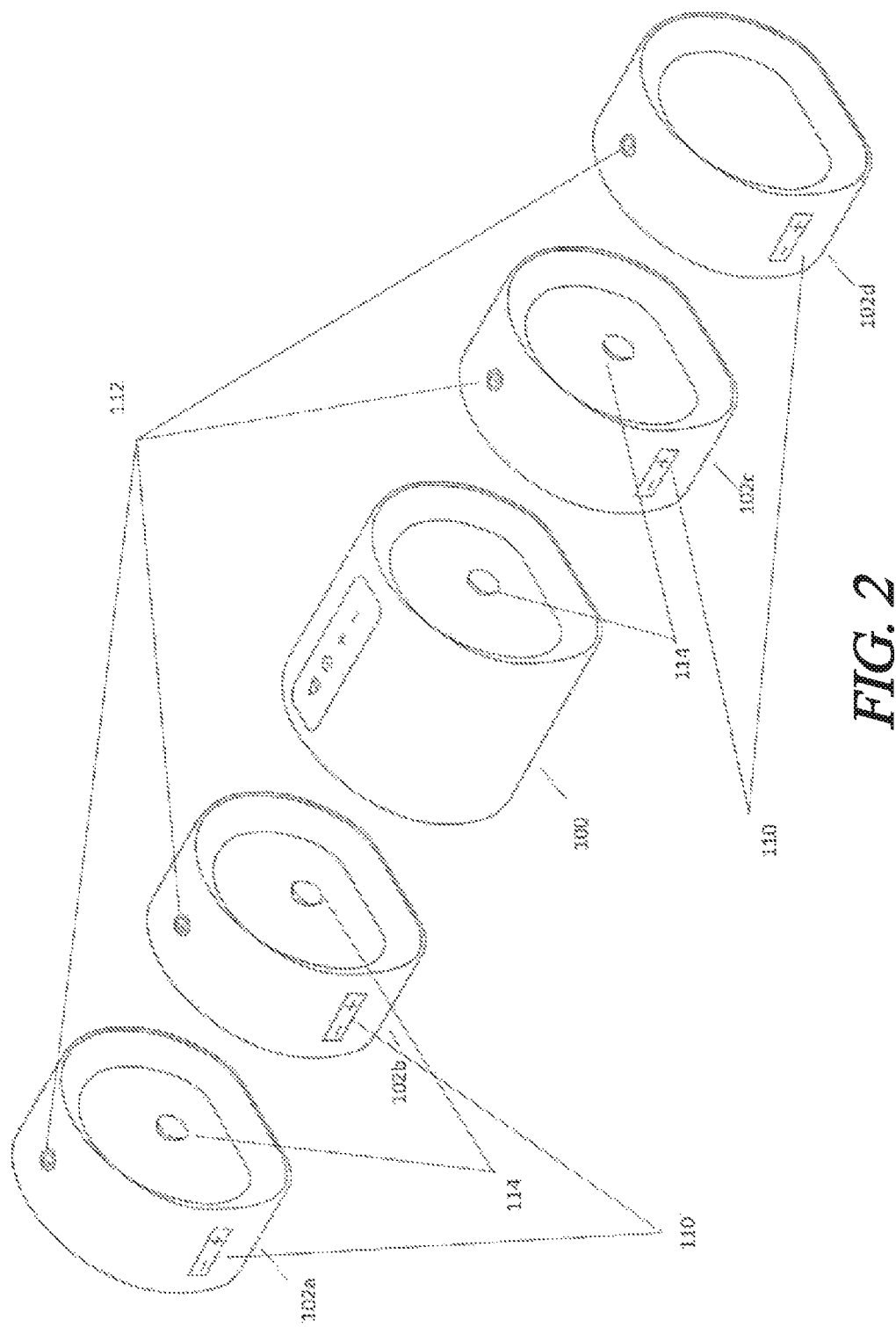
FIG. 2 illustrates the speaker system with the center module and the speakers detached.
Figure 3:
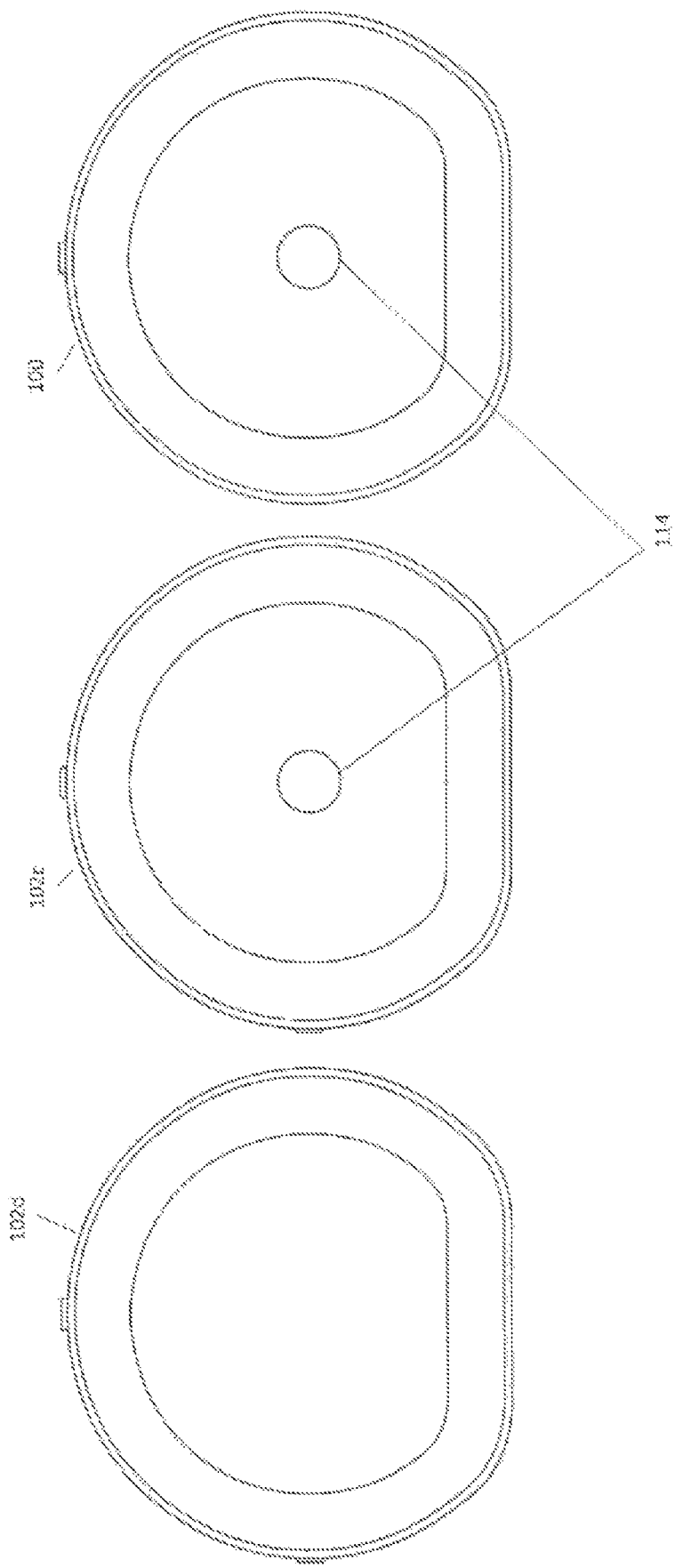
FIG. 3 illustrates a side view of the connections of the speakers.

Turning to FIGS. 2 and 3, when the system 10 is in use, each of the speakers 102a, 102b, 102c, 102d can be disconnected from the center unit. As can be seen in this exploded view, the center module 100 and the speakers 102a, 102b, 102c each include a connection 114. In this embodiment, the end speaker 102d does not include a connection. In alternative embodiments, each speaker includes a connection.

Where the connection is a snap connection or a magnetic connection, the speakers 102 are disconnected by applying sufficient force to overcome the magnetic or friction force of the connection. Where the connection is a sliding connection, the speakers 102 are disconnected by sliding or turning the speakers. The speakers may also be connected by a locking mechanism with a release mechanism (not shown in this view). After separation, the speakers 102a, 102b, 102c, 102d can be placed within 200 feet of the center module 100, such as around a room, in preparation for use. When the system 10 is done being utilized, each speaker 102a, 102b, 102c, 102d may be reconnected to the center module 100 using the same connection 114 in preparation for storage or travel.

Each of the speakers 102a, 102b, 102c, 102d is capable of producing whole or partial sound, depending upon how the speaker 102a, 102b, 102c, 102d is utilized. When in use, if the speakers 102a, 102b, 102c, 102d are detached from the center module 100, each speaker 102a, 102b, 102c, 102d produces whole audio. In another embodiment, when the speakers 102a, 102b, 102c, 102d are connected to the center module 100 and are in use, each speaker only produces a portion of audio. For example, a speaker 102a, 102b, 102c, 102d that is connected to the left of the center module 100 produces left stereo sound, while a speaker 102a, 102b, 102c, 102d that is connected to the right of the center module 100 will produce right stereo sound.

The connection 114 also serves to transfer power between the center module 100 and the speakers 102a, 102b, 102c, 102d. Each speaker includes an individual battery (not shown). To charge the batteries of the speakers in the system 10, the center module 100 is plugged into a power source. While the center module 100 charges, power is also transferred to the attached speakers 102a, 102b, 102c, 102d through the connection 114 thus eliminating the need to charge the speakers 102a, 102b, 102c, 102d individually.

Figure 4:
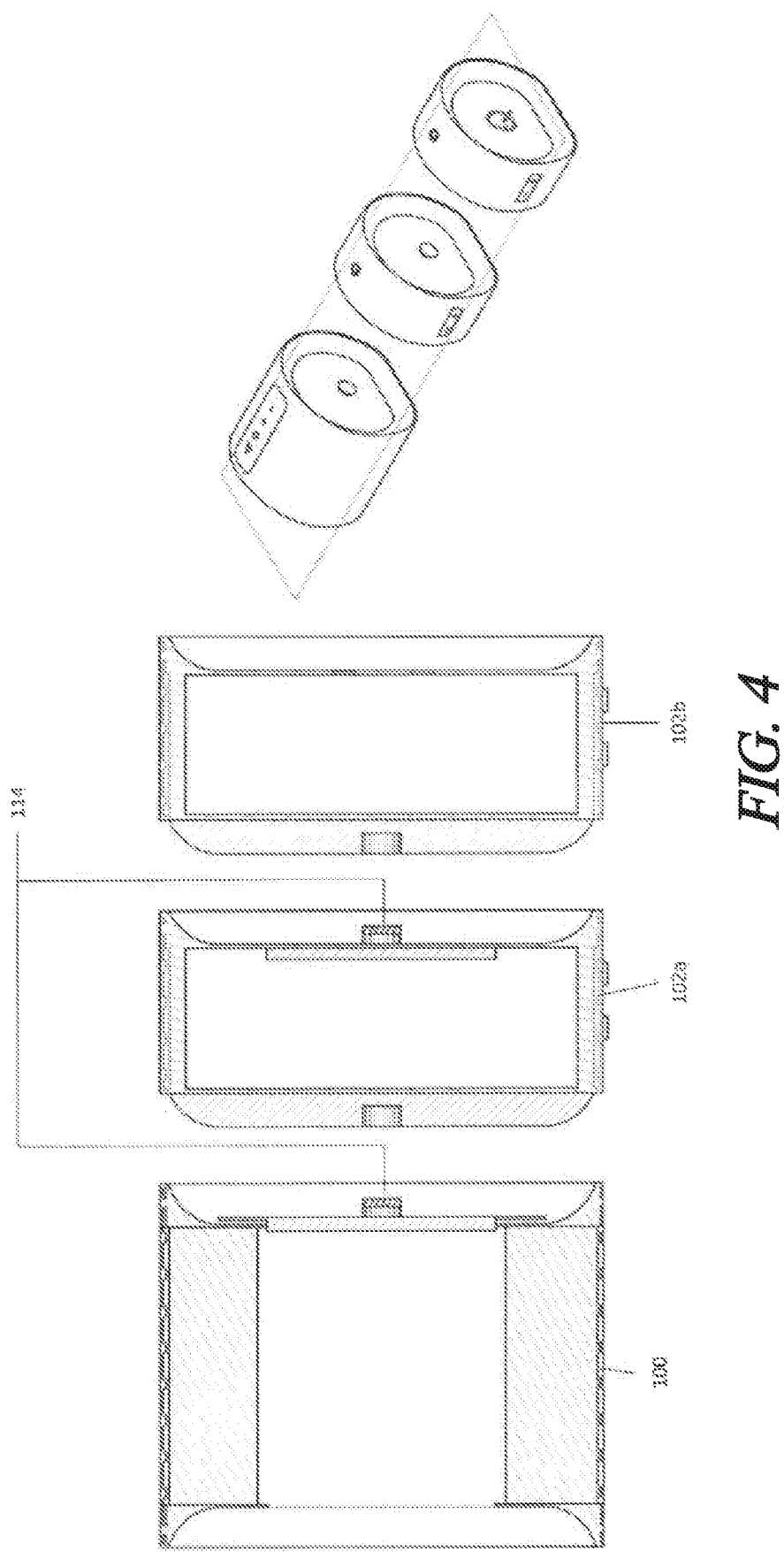
FIG. 4 illustrates a cross-sectional view of the connections of the speaker system

As illustrated in the cross-sectional view of the system 10 in FIG. 4, the connections 114 both mechanically and electrically connect the speakers 102a, 102b, 102c, 102d to each other and to the center module 100. The electrical connection allows for the transfer of power from the center module 100.

In the illustrated embodiment, the center module 100 includes a male connector on the right side. A middle speaker 102a has a female connector on its left side, configured to receive the male connector of the center module 100. The middle speaker 102a also includes a male connector on its right side. An end speaker 102b includes a female connector on its left side, configured to receive the male connector of the middle speaker 102a. In the illustrated embodiment, the end speaker only includes a single connector. In an alternative embodiment, the end speaker may include an additional connector on a right side to allow connection to additional speakers.

While the illustrated embodiment does not show a connector on the left side of the center module 100, it should be understood that in alternative embodiments, any type of connector may be employed on each side of the center module and speakers.

Figure 5:
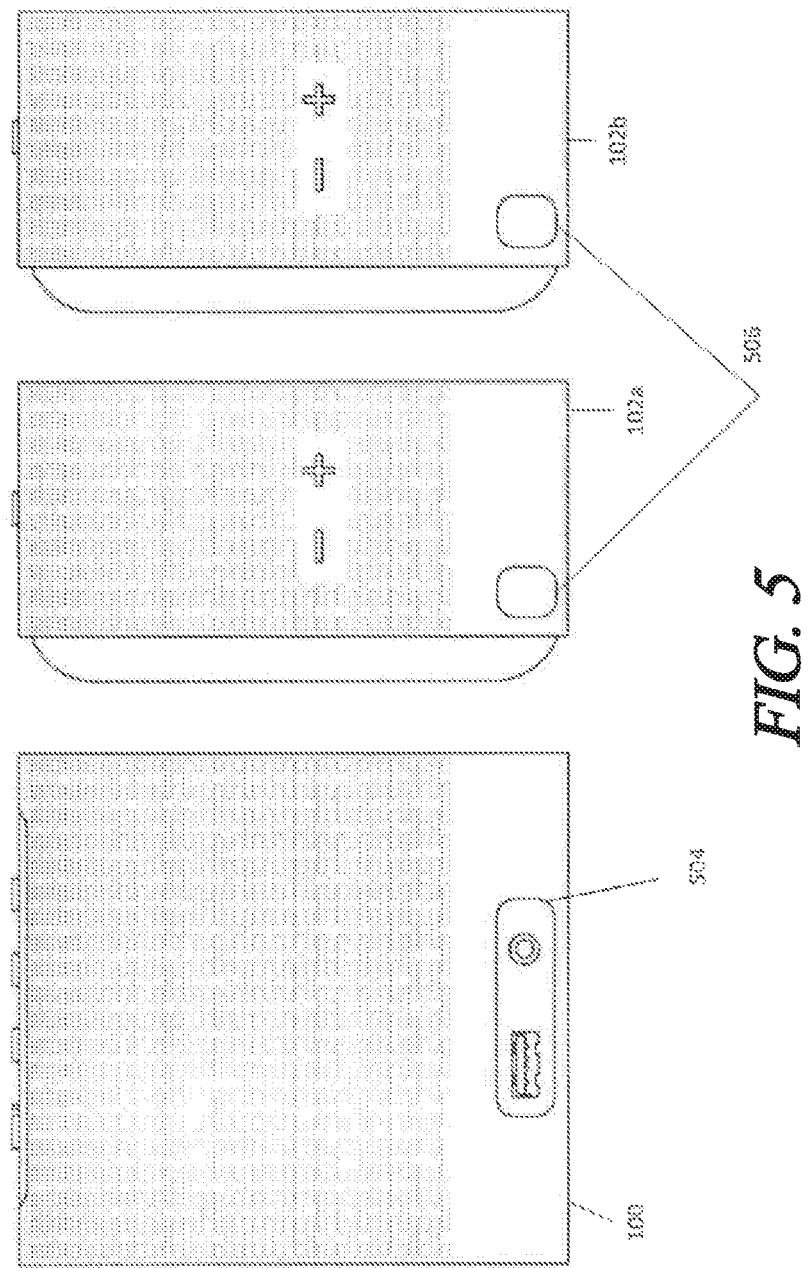
FIG. 5 illustrates a rear view of a portion of the speaker system with the center module and the speakers detached.

FIG. 5 illustrates a rear view of a portion of the speaker system 10. In this view, a release button 506 is shown on the back of the speakers 102a, 102b. The center module 100 is configured to be in signal communication with an external audio device. Exemplary audio devices include, without limitation, radio receivers, phones, tablets, computers, phonographs, televisions, MP3 players, compact disk players, and cassette players. In one embodiment, an external device plugs into the center module 100 using a line in or other input 504. In another embodiment, the center module 100 wirelessly communicates with the external audio device through a communication protocol such as Bluetooth. When an external device is connected to the center module 100, the center module 100 communicates with the speakers 102a, 102b, 102c, 102d using RF communication. In one embodiment, the center module 100 communicates with the speakers 102a, 102b, 102c, 102d using FM radio waves resulting in very little delay or no delay. In another embodiment, the center module 100 communicates with the speakers 102a, 102b, 102c, 102d using a wireless connection band.

Figure 6:
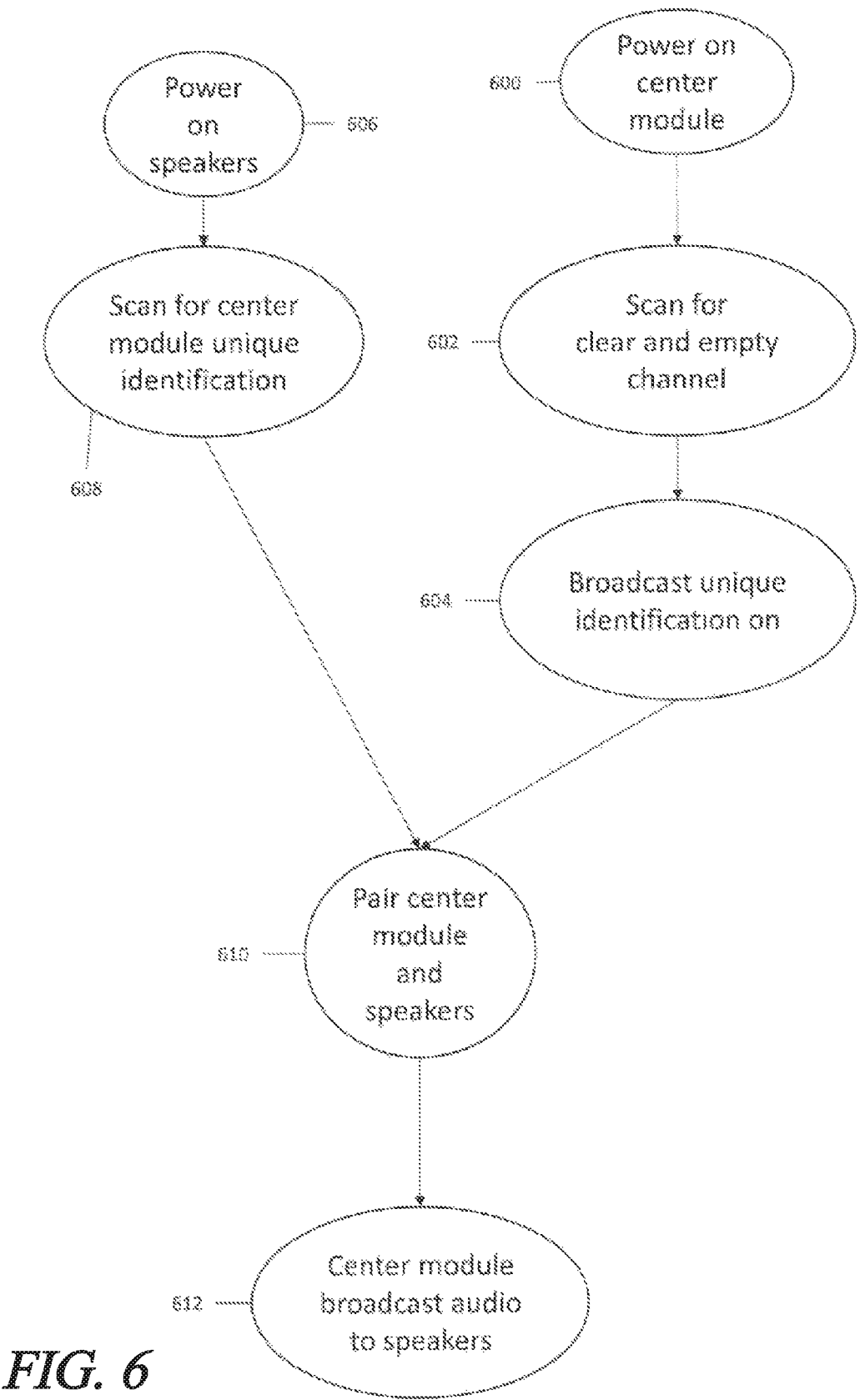
FIG. 6 illustrates a flowchart for audio communication utilizing the proposed system.

As illustrated by the flowchart of FIG. 6, initializing the speaker system 10 occurs using the existing wireless band or FM radio spectrum. In one embodiment, the system 10 functions utilizing one-way communication from the center module 100 to the speakers 102a, 102b, 102c, 102d, eliminating the need for establishing a handshake or additional connections between the center module 100 and the speakers 102a, 102b, 102c, 102d. The center module 100 contains with a unique identification number. When the center unit is powered on 600, the center module 100 initializes the wireless band and broadcasts its unique identification using the wireless band. In one embodiment, the wireless band is a 5.8 GHz wireless band. In an alternative embodiment, the system 10 functions utilizing two-way communication from the center module 100 to the speakers 102a, 102b, 102c, 102d, which may include a handshake or other pairing step. In such an embodiment, the two-way communication may occur over a 5.8 GHz wireless band.

In one embodiment, when the center unit is powered on 600, the center module 100 scans the FM radio spectrum for a clear and unused channel 602. When an empty channel is found, the center module 100 broadcasts its unique identification on that channel using the Radio Data System (RDS) communications protocol 604. If this is the first broadcast for the center module 100, the center module 100 begins searching for a clear and empty channel starting with the lowest known FM radio channel. If this is not the first broadcast for the center module 100, the center module 100 starts the scan of the FM radio spectrum at the last known channel it broadcasted on to determine if it is a clear and empty channel. If it is, the center module 100 will broadcast its unique identification. If the last known channel is no longer clear and empty, the center module 100 will begin searching the FM radio spectrum.

The speakers 102a, 102b, 102c, 102d are also powered on 606 and begin scanning searching for the center module's 100 unique identification 608 on either the wireless band or the FM radio spectrum. The speakers 102a, 102b, 102c, 102d may be powered on before the center module 100 is powered on. Alternatively, the speakers 102a, 102b, 102c, 102d may be powered on at the same time or after the center module 100 is powered on. Each speaker may be manually powered on individually, by pressing a power button 112. Alternatively, the speakers 102a, 102b, 102c, 102d may be powered on by the center module 100, such as through a wireless signal or through the connection 114.

The speakers 102a, 102b, 102c, 102d are programmed to look for only the center module 100 unique identification. In one embodiment, the speakers connect to the wireless band and search for the center module's 100 unique identification. In another embodiment, the speakers begin with the last known channel the center module 100 broadcasted on and searches for the center module's 100 unique identification.

If the center module is not located on that channel, the speakers 102a, 102b, 102c, 102d begin scanning the FM radio spectrum. If this is the first time the speakers 102a, 102b, 102c, 102d have connected to the center module 100, the speakers 102a, 102b, 102c, 102d begin scanning for the center module's 100 unique identification starting with the lowest known FM radio channel.

When the center module 100 and the speakers 102a, 102b, 102c, 102d are paired 610 the center unit can broadcast audio 612 from the external modules to the speakers 102a, 102b, 102c, 102d over the selected communication channel. The entire process connecting the center module 100 to the speakers 102a, 102b, 102c, 102d takes only a few seconds or fractions of a second.

In an alternative embodiment, where the center module 100 and the speakers 102a, 102b, 102c, 102d are in two-way communication over a 5.8 GHz wireless band, the speakers and module may be paired together with a handshake or other communication protocol, and the step of scanning over a communication band may be omitted.

In one embodiment, additional speakers can be added to the ends of the existing system 10 using the same connection 114. If additional speakers are added to the system 10, the new speakers would need to be paired with the center module 100 to look for the center module's 100 unique identification. However, no handshake or additional connections are necessary. The present system 10 allows for multiple units in the same house without interference because each speaker is coded to only look for the paired center module 100.

In another embodiment, if additional speakers (not shown) are added to the system 10, the new speakers would simply be connected to the existing system 10. Upon connection to the center module 100 or an existing speaker 102a, 102b, 102c, 102d, an electrical signal would be passed between the speaker connections to the new speaker providing the new speaker with the center module 100 connection information. The speakers can then be removed as previously described and are ready to begin broadcasting audio.

Figure 7:
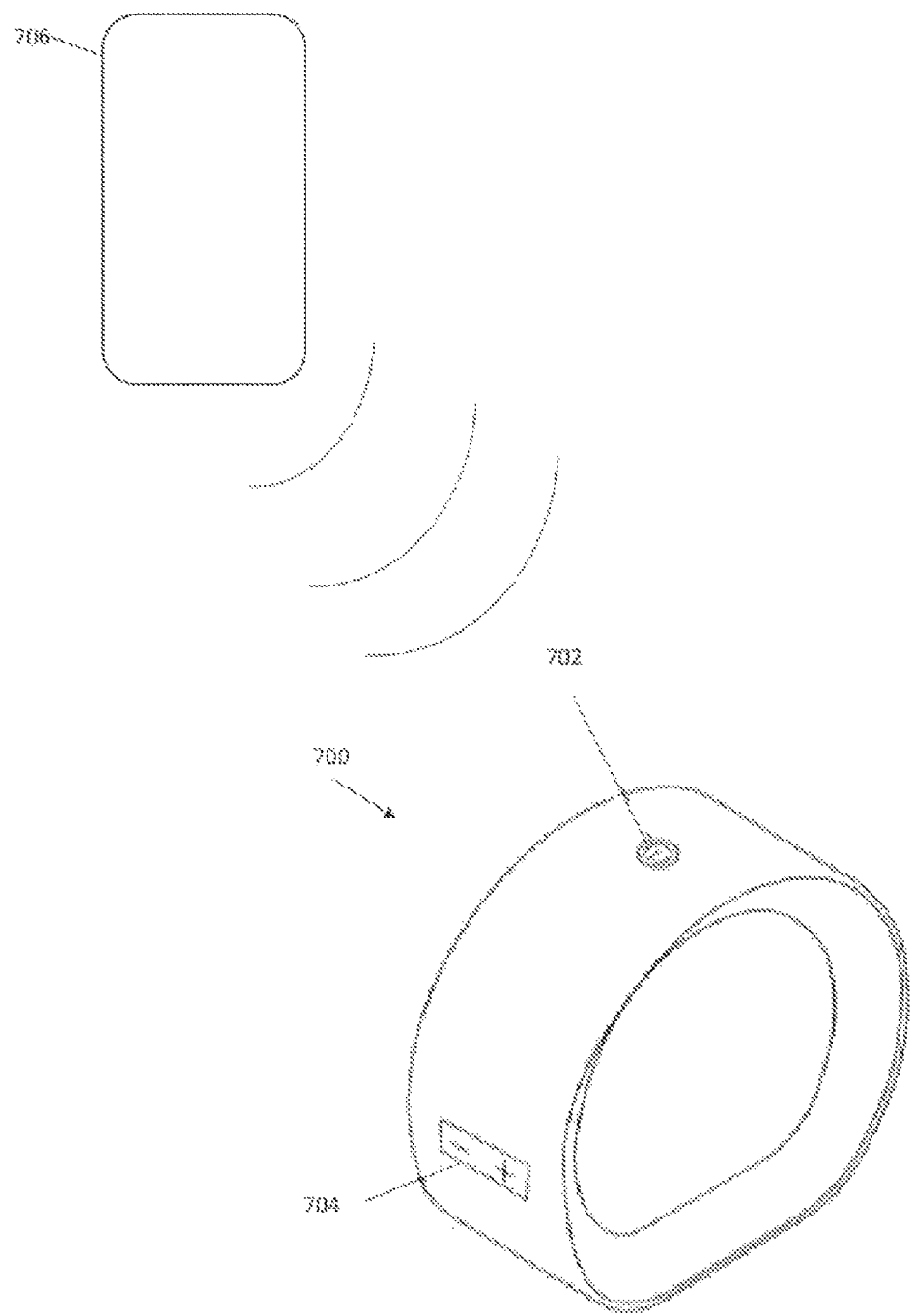
FIG. 7 illustrates a stand-alone speaker.

FIG. 7 illustrates a single stand-alone speaker 700 that can be used without a connection to a center module 100. The single stand-along speaker 700 can be removed from the system 10 and placed within a 200 ft radius around an existing audio module (not shown). The stand-alone speaker 700 still has its own power button 702 and volume controls 704 allowing the unit to have individual control of sound levels and power. When the system 10 is done being utilized, the stand-alone speaker 700 can be reconnected to a larger system with a center module 100 for charging in preparation for storage or travel or simply powered off in preparation for storage or travel.

The stand-alone speaker 700 functions utilizing one-way communication from an external audio device 706. Exemplary audio devices include, without limitation, radio receivers, phones, tablets, computers, phonographs, televisions, MP3 players, compact disk players, and cassette players. In one embodiment, the external device plugs into the stand-alone speaker 700 using a line in or other input. In another embodiment, the stand-alone speaker 700 wirelessly communicates with the external audio device through a communication protocol such as Bluetooth. The stand-alone speaker 700 can be used as a single unit or can be used with multiple stand-alone speakers that each connect to the external audio device. When utilized as a stand-alone speaker 700, without connecting to a center module 100, the stand-alone speaker 700 produces whole audio sound.

In another embodiment, the system 10 can be utilized in a conference call environment. The system 10 would include the center module 100 and the four or more speakers 102a, 102b, 102c, 102d spaced around a room for conference calling. The center module 100 and speakers 102a, 102b, 102c, 102d would connect in the same manner as previously described, however, the center module 100 and the speakers 102a, 102b, 102c, 102d would be set up for two way communication instead of simply one-way communication. Two-way communication allows the conference room attendees to talk during the call without having to move the microphone closer to the speaker. The system 10 would still function without requiring a handshake between the center module 100 and the speakers 102a, 102b, 102c, 102d.

Figure 8A:
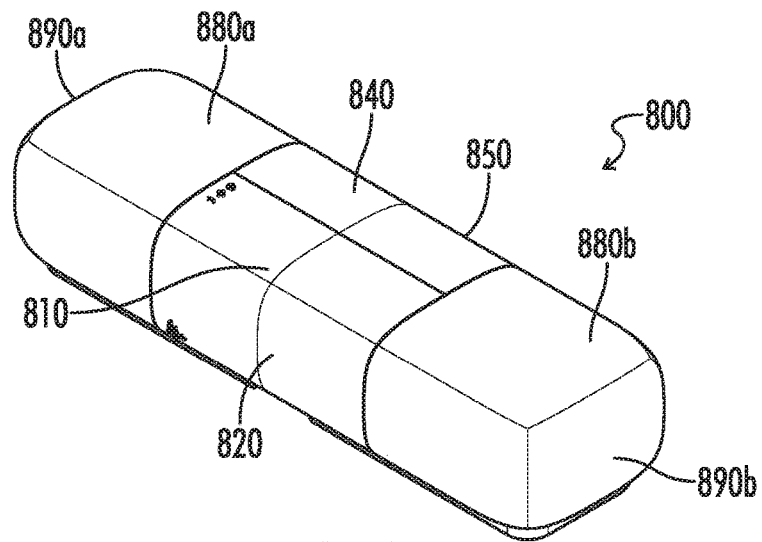
FIG. 8A illustrates an embodiment of a speaker system in accordance with this disclosure in a first configuration.
Figure 8B:
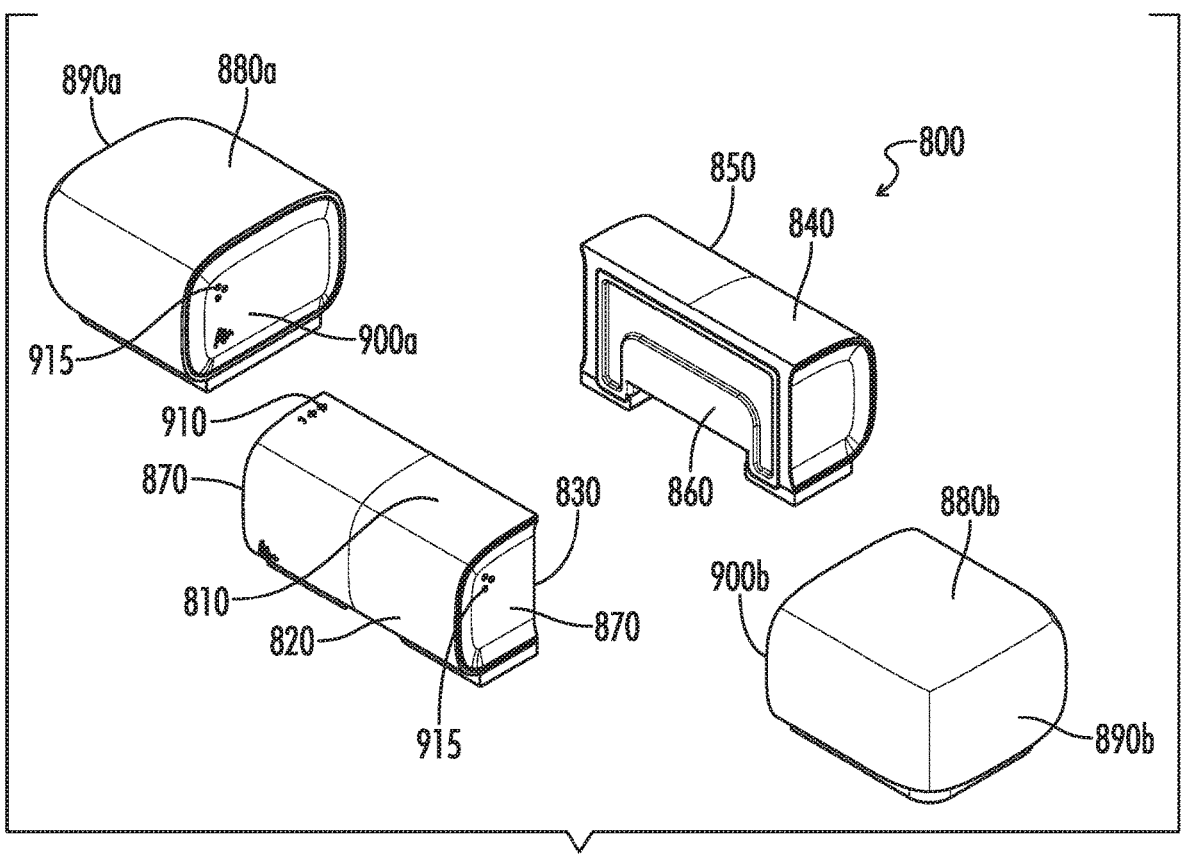
FIG. 8B illustrates the speaker system of FIG. 8A in an exploded view.
Figure 9A:
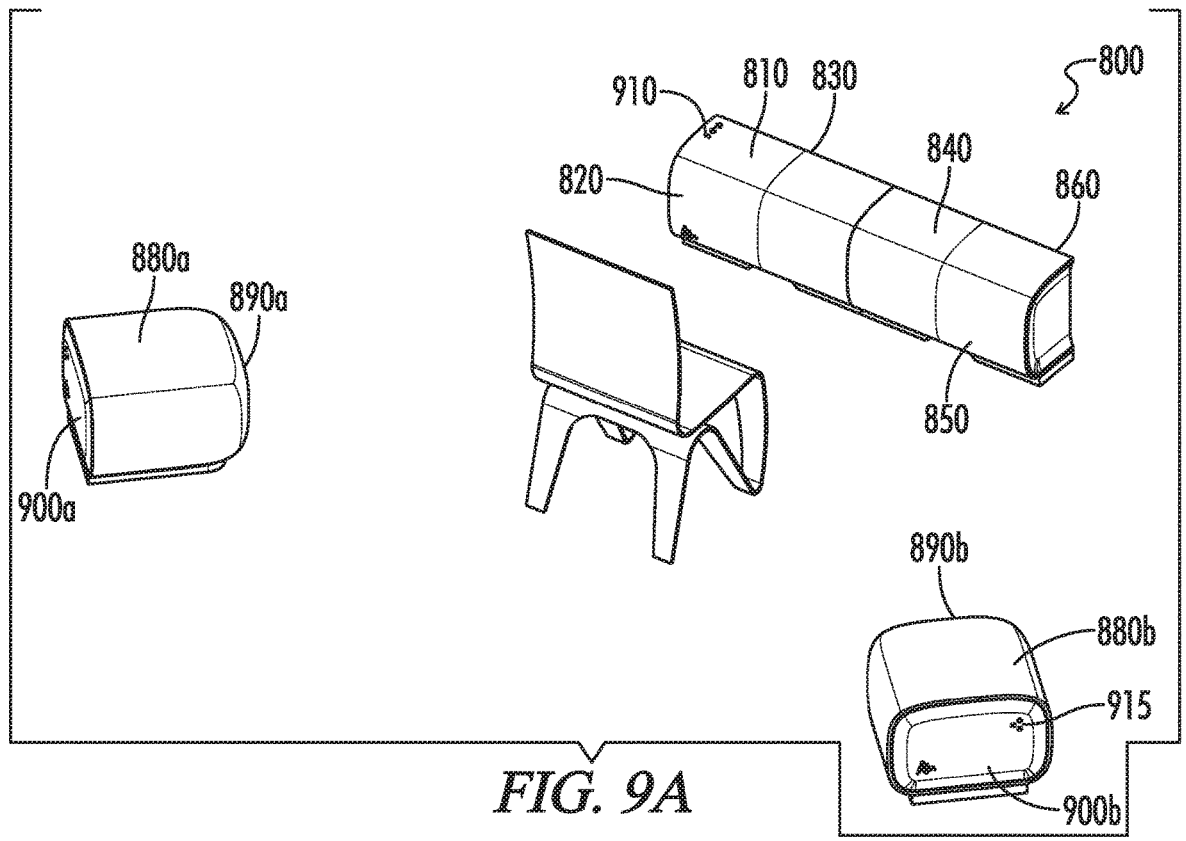
FIG. 9A is a perspective view of the speaker system of FIG. 8A in a second configuration.
Figure 9B:
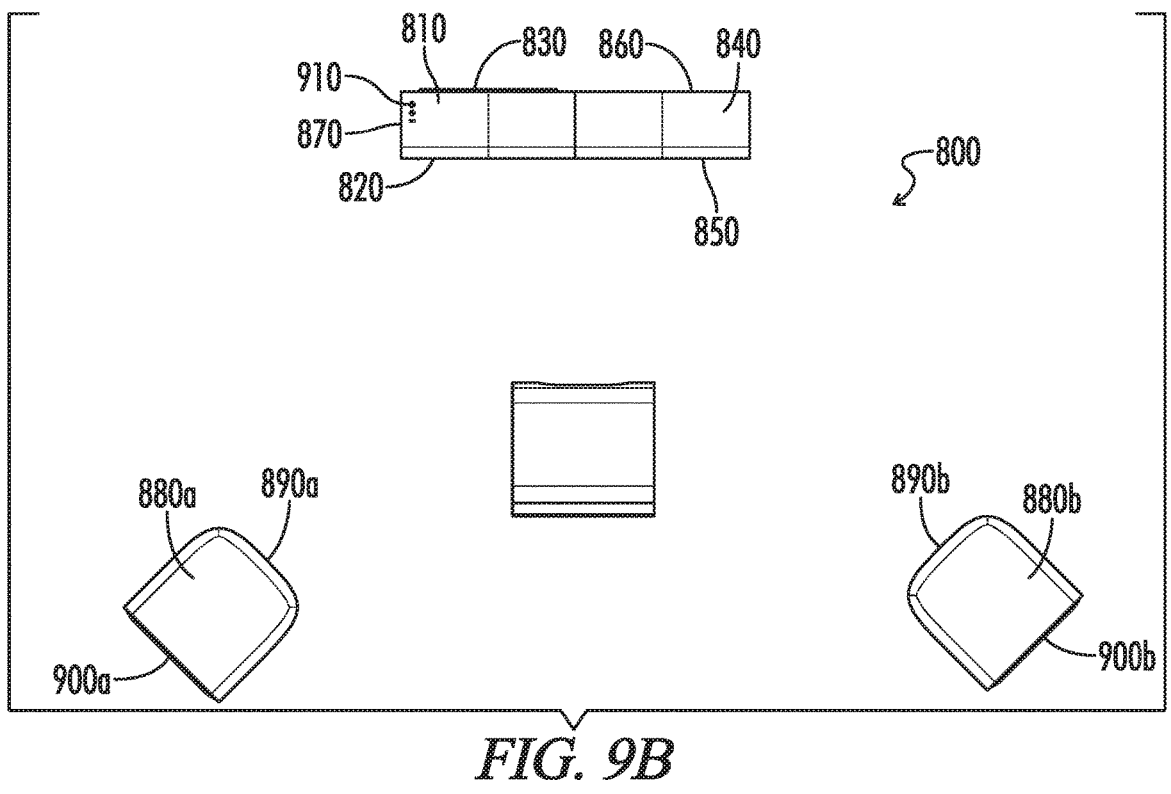
FIG. 9B is an overhead view of the speaker system of FIG. 8A in the second configuration

FIG. 8A illustrates an embodiment of a speaker system 800 in accordance with this disclosure in a first configuration. FIG. 8B shows the embodiment of FIG. 8A in an exploded view, and FIGS. 9A and 9B show the speaker system of FIG. 8A in a second configuration.

As shown, the system 800 comprises a primary speaker module 810 configured to communicate with an external audio device. The primary speaker module has a speaker output face 820 and a back surface 830 opposite the speaker output face.

The system 800 further comprises a secondary speaker module 840 in signal communication with the primary speaker module 810. The secondary speaker module 840 also has a speaker output face 850 and a back surface 860.

The system 800 has a first configuration, as shown in FIG. 8A, in which the primary speaker module 810 and the secondary speaker module 840 are connected at their respective back surfaces 830, 860, such that their respective speaker output faces 820, 850 face opposite directions. In such a configuration, when the speakers are in use, sound from the speaker output faces 820, 850 spreads in multiple directions from the speaker system 800.

The system 800 further has a second configuration, as shown in FIG. 9, in which the primary speaker module 810 and the secondary speaker module 840 are side by side, and their respective speaker output faces 820, 850 face the same direction. In some embodiments, the primary speaker module has a first connector on its back surface 820 for connecting the primary speaker module 810 to the secondary speaker module 840 in the first configuration, and a second connector on a side surface 870 for connecting the primary speaker module 810 to the secondary speaker module 840 in the second configuration.

The connectors may be similar to those shown, for example, in FIG. 2 and discussed above with respect to element 114. Alternatively, as discussed above, the connectors may be magnetic and may not be visible at a surface of the various speaker modules 810, 8140.

In some embodiments, when the system 800 is in the first configuration, shown in FIG. 8A, both the primary speaker module 810 and the secondary speaker module 840 may output full sound in a monophonic format. In this way, the full sound received from the external audio device may be output in multiple directions. However, when in the second configuration, shown in FIG. 9, the system 800 may function as a sound bar, with the left and right halves of the sound bar outputting different portions of stereophonic output. Accordingly, when in the second configuration, the primary speaker module 810 may output left stereo sound and the secondary speaker module 840 may output right stereo sound, or vice versa.

In some embodiments, the primary speaker module 810 and the secondary speaker module 840 may be located next to each other, but not mechanically connected to each other, in the second configuration. In such a configuration, the speaker modules 810, 840 can be distanced from each other in order to enhance the stereophonic effect of the two speakers. In such an embodiment, the speakers would be in wireless communication with each other in the second configuration. In other embodiments, the speaker modules 810, 840 are mechanically linked in both the first and second configurations. In such embodiments, the speakers may be linked by a direct electrical audio interface, or they may be linked wirelessly for the purpose of relaying sound. Accordingly, the primary speaker module 810 may comprise a transceiver configured to pair the speaker module with an external device to receive audio and one or more output module for broadcasting audio received from the device to the secondary and tertiary speaker modules 840, 880a, b. The secondary and tertiary speaker modules 840, 880a, b, as well as any other speaker modules in the system 800, may be provided with transceivers for receiving audio channels from the primary speaker module 810 when properly linked.

Similarly, with respect to the external audio device, the primary speaker module 800 is configured to be in signal communication with an external audio device, as in the module 100 of FIG. 5, and as discussed above. Exemplary audio devices include, without limitation, radio receivers, phones, tablets, computers, phonographs, televisions, MP3 players, compact disk players, and cassette players. In one embodiment, an external device plugs into the primary speaker module 810 using a line in or other input. In another embodiment, the module 810 wirelessly communicates with the external audio device through a communication protocol such as Bluetooth.

The system 800 typically further comprises at least one or several tertiary speaker module 880a, b. The tertiary speaker modules 880a, b typically also each have a speaker output face 890a, b and a back surface 900a, b and are able to be in wireless signal communication with the primary speaker module 810, particularly in the second configuration. When the system 800 is in the first configuration, the tertiary speaker modules 880a, b are each attached to the primary speaker module 810 or the secondary speaker module 840, as shown in FIG. 8A. As shown, the tertiary speaker modules 880a, b may be fixed such that the speaker output faces 890a, b are arranged at right angles to the speaker output faces 820, 850 of the primary and secondary speaker modules 810, 840 and face opposite directions. The back surfaces 900a, b of the tertiary speakers modules 880a, b may therefore be connected to side surfaces 870 of the primary or secondary speaker module 810, 840. In this way, the audio from the speakers may be output in four distinct directions, and the speaker may be placed in the center of a room for listening.

When in the second configuration, the primary speaker module 810 and the secondary speaker module 840 combine to form an elongated sound bar, as discussed above. Further, the tertiary speaker modules 880a, b may be arranged about a listener to form a surround sound environment. Accordingly, the speaker system 800 may be configured to output a different audio signal to each speaker in order to implement surround sound protocols. For example, the primary speaker module 810 and secondary speaker 840 module may be located at a screen being watched to provide left and right stereo sound, while the tertiary speaker modules 880a, b may provide front or rear left and right channels respectively.

Accordingly, when in the first configuration, each of the primary, secondary, and tertiary speaker modules 810, 840,

880a, b may output full audio. In the second configuration, all such modules 810, 840, 880a, b may be provided with distinct audio channels as controlled by the primary speaker module 810. In some embodiments, the primary speaker module 810 may determine whether the speaker system 800 is in the first or second configuration, and may thereby adjust the audio output accordingly. In some embodiments, the primary speaker module 810 may further detect the relative locations of the tertiary speaker modules 880a, b and may determine what audio channels to transmit thereto accordingly. In other embodiments, a user may program the primary speaker module 800 to properly transmit an appropriate audio channel to the tertiary speaker modules 880.

In some embodiments, the primary speaker module 810 and/or the secondary speaker module 840 may further comprise a subwoofer component in order to reproduce low end sound. Further, in some embodiments, the primary speaker module 810, 840 may output the same audio channel while the tertiary speakers output stereo sound. Accordingly, when the primary and secondary speaker modules 810, 840 are combined, they may output bass from the subwoofer and center channel sound, thereby supporting a traditional 3.1 surround sound output. Alternatively, in some embodiments, a subwoofer unit may be provided independently as an accessory and may then mate with the provided speaker modules.

Each of the speaker modules 810, 840, 880a, b may be provided with connectors for retaining the system 800 in the first configuration. As discussed above, a first connector may be provided at the back surface 830 of the primary speaker module 810 for connecting to the secondary speaker module 840 in the first configuration, while a second connector may be provided at a side surface 870 of the primary speaker module 810 for connecting to the secondary speaker module 840 in the second configuration. Similarly, the second connector may be used in the first configuration to retain one of the tertiary speaker modules 880a while a further connector may be provided on the opposite side surface 870 of the primary speaker module 810 for the second of the tertiary speaker modules 880b.

As shown, the primary speaker module 810 may further comprise audio controls 910. Such controls may be used to control all speakers in the system 800, and the secondary speaker module 840 and tertiary speaker modules 880a, b may not be provided with comparable controls.

Further, each of the primary, secondary, and tertiary speaker modules 810, 840, 880a, b may be provided with batteries for powering the respective module. In such an embodiment, each of the connectors discussed above may be provided with an electrical interface 915, such that all batteries may charge through the connectors. Such an electrical interface 915 may be integrated into a mechanical connector or a magnetic surface, and may be combined with an electrical audio interface. Accordingly, the primary speaker module 810 may be plugged in and may thereby provide power to all other speaker modules by way of the connectors.

Figure 10A:
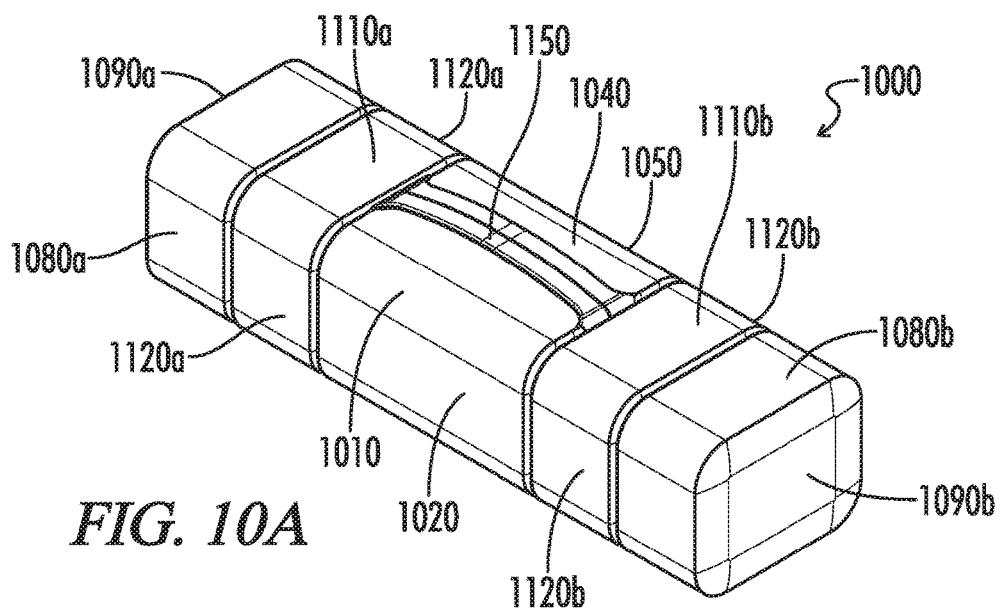
FIG. 10A illustrates an embodiment of a speaker system in accordance with this disclosure in a first configuration.
Figure 10B:
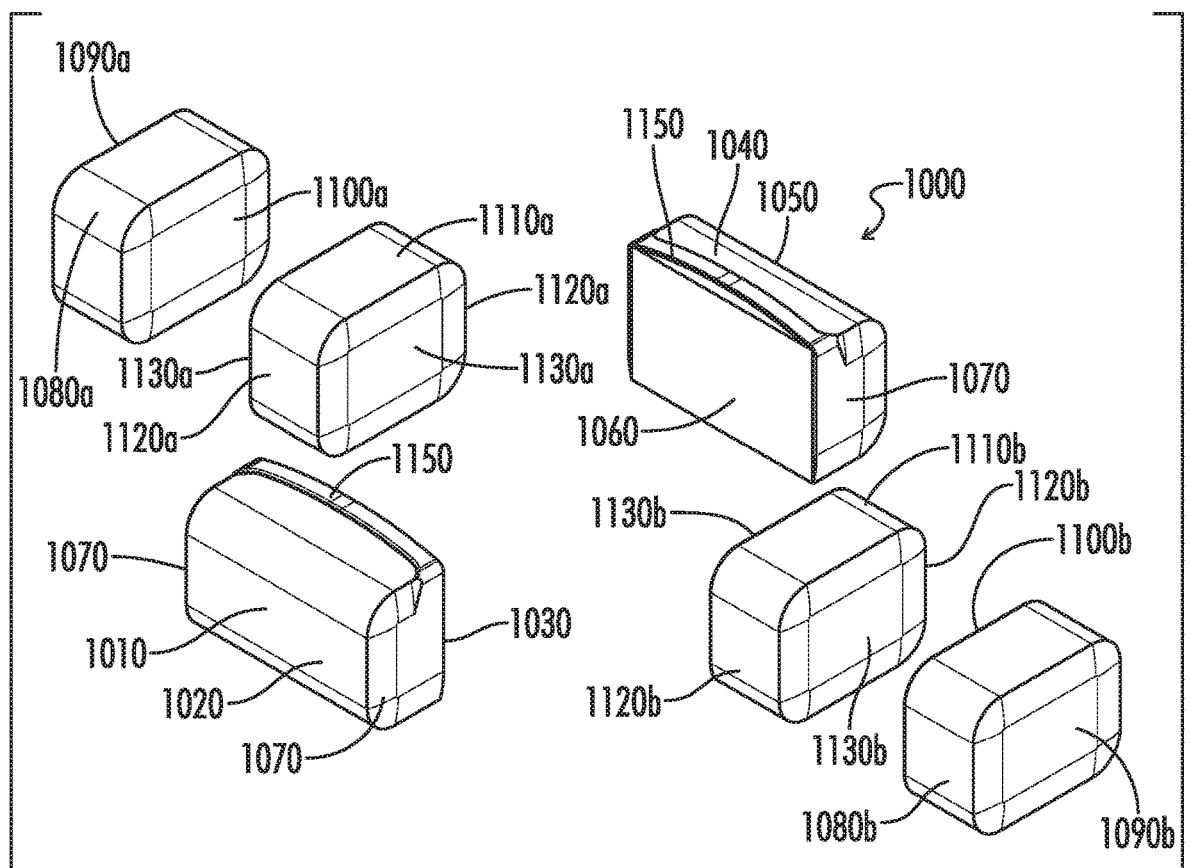
FIG. 10B illustrates the speaker system of FIG. 10A in an exploded view.
Figure 11A:
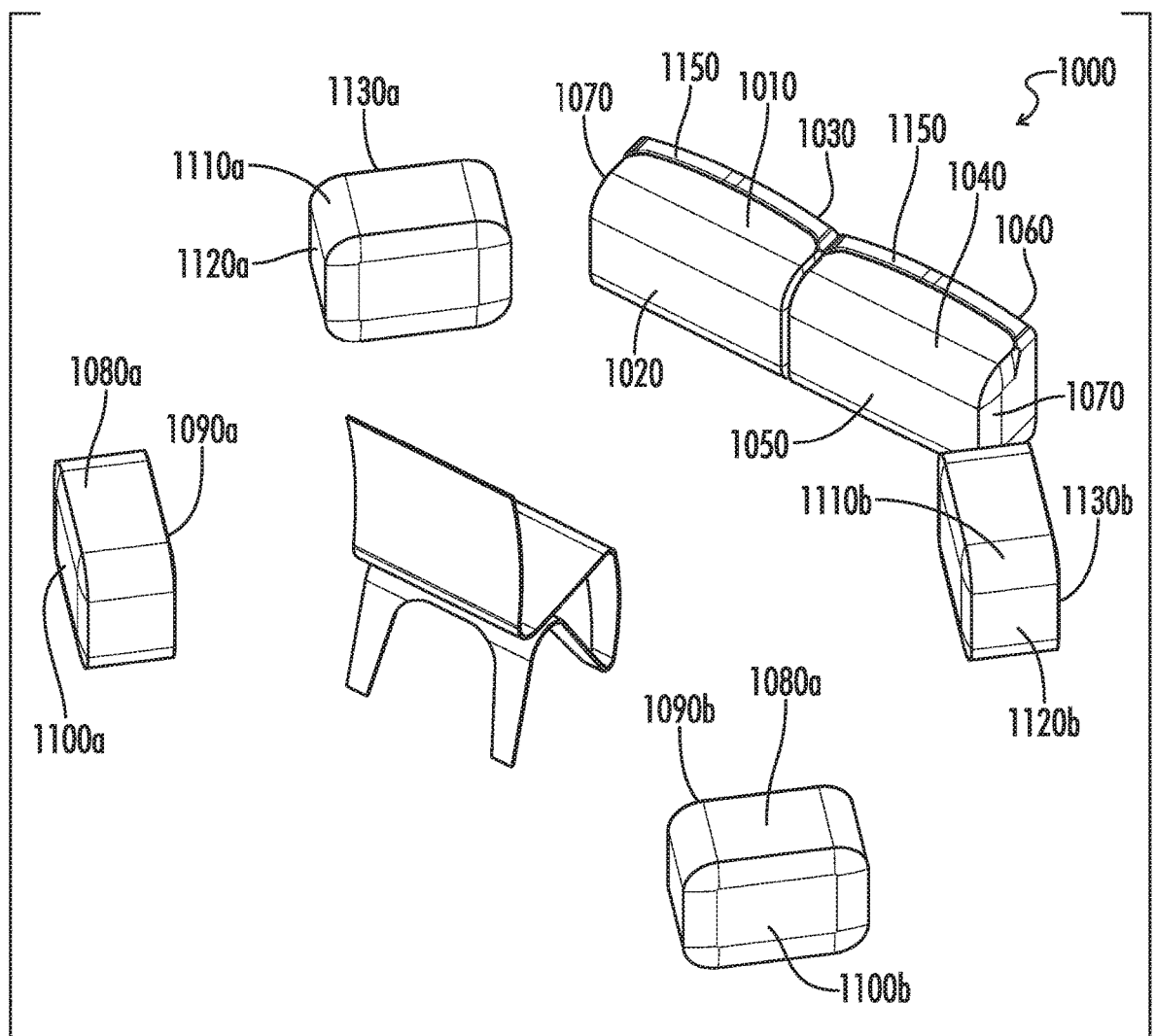
FIG. 11A is a perspective view of the speaker system of FIG. 10A in a second configuration.
Figure 11B:
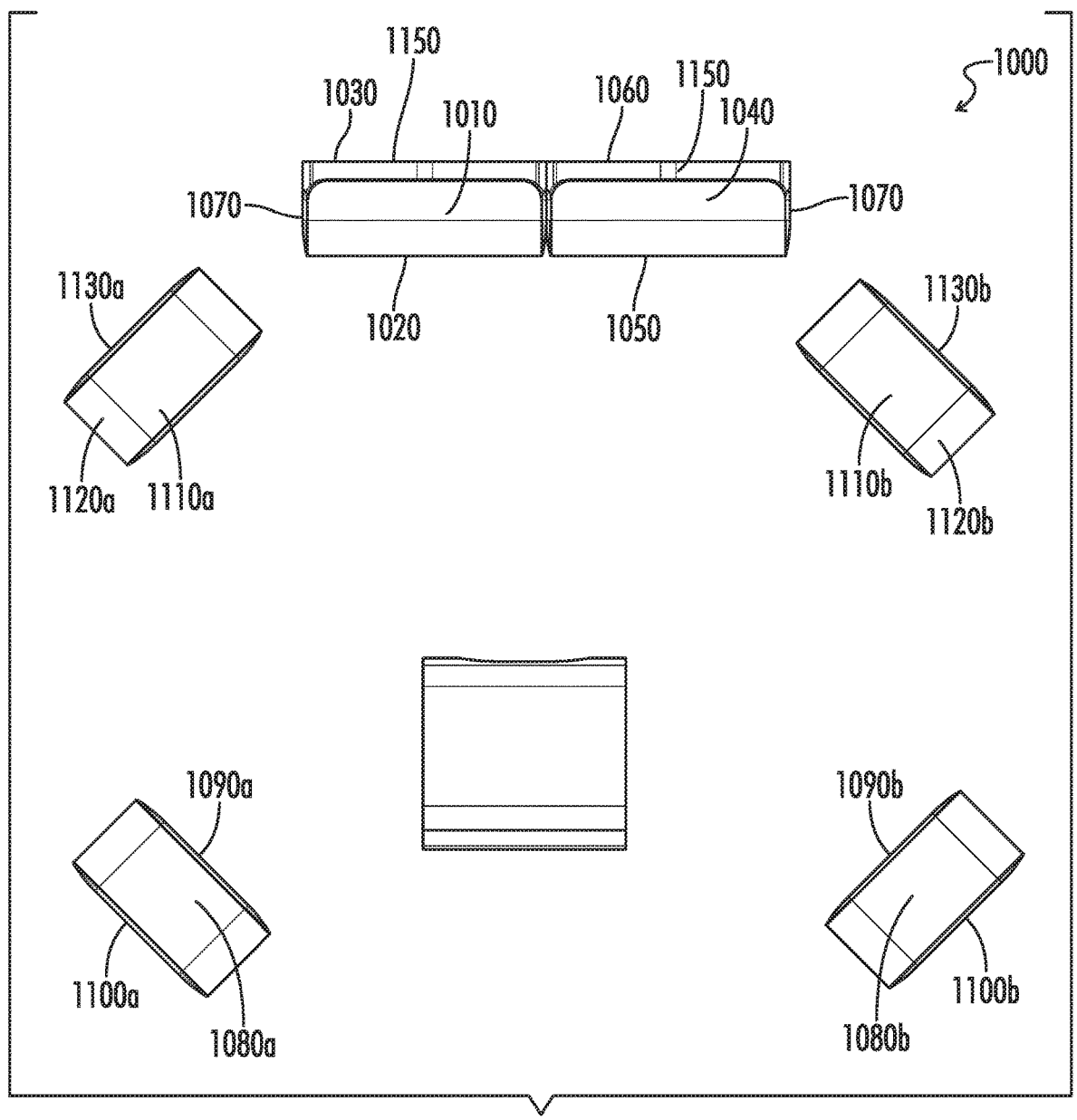
FIG. 11B is an overhead view of the speaker system of FIG. 10A in the second configuration.

FIG. 10A illustrates an embodiment of a speaker system 1000 in accordance with this disclosure in a first configuration. FIG. 10B illustrates the speaker system 1000 of FIG. 10A in an exploded view. FIGS. 11A and 11B illustrates the speaker system 1000 of FIG. 10A in a second configuration. FIGS. 12A, 12B, 13A, and 13B illustrate a similar embodiment of a speaker system 1000 in accordance with this disclosure in a first configuration. As both embodiments are described together, the same reference numerals are used across both embodiments.

Figure 12A:
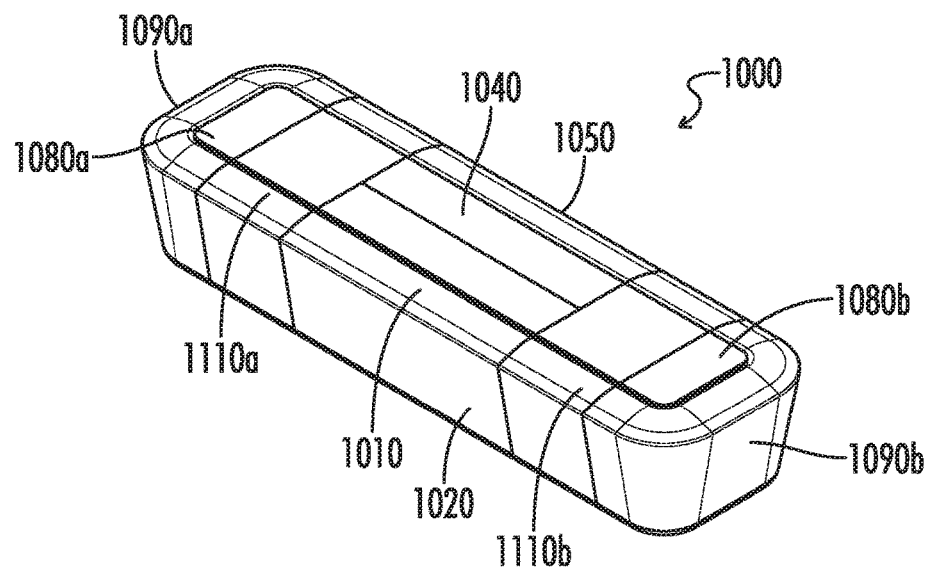
FIG. 12A illustrates an embodiment of a speaker system in accordance with this disclosure in a first configuration.
Figure 12B:
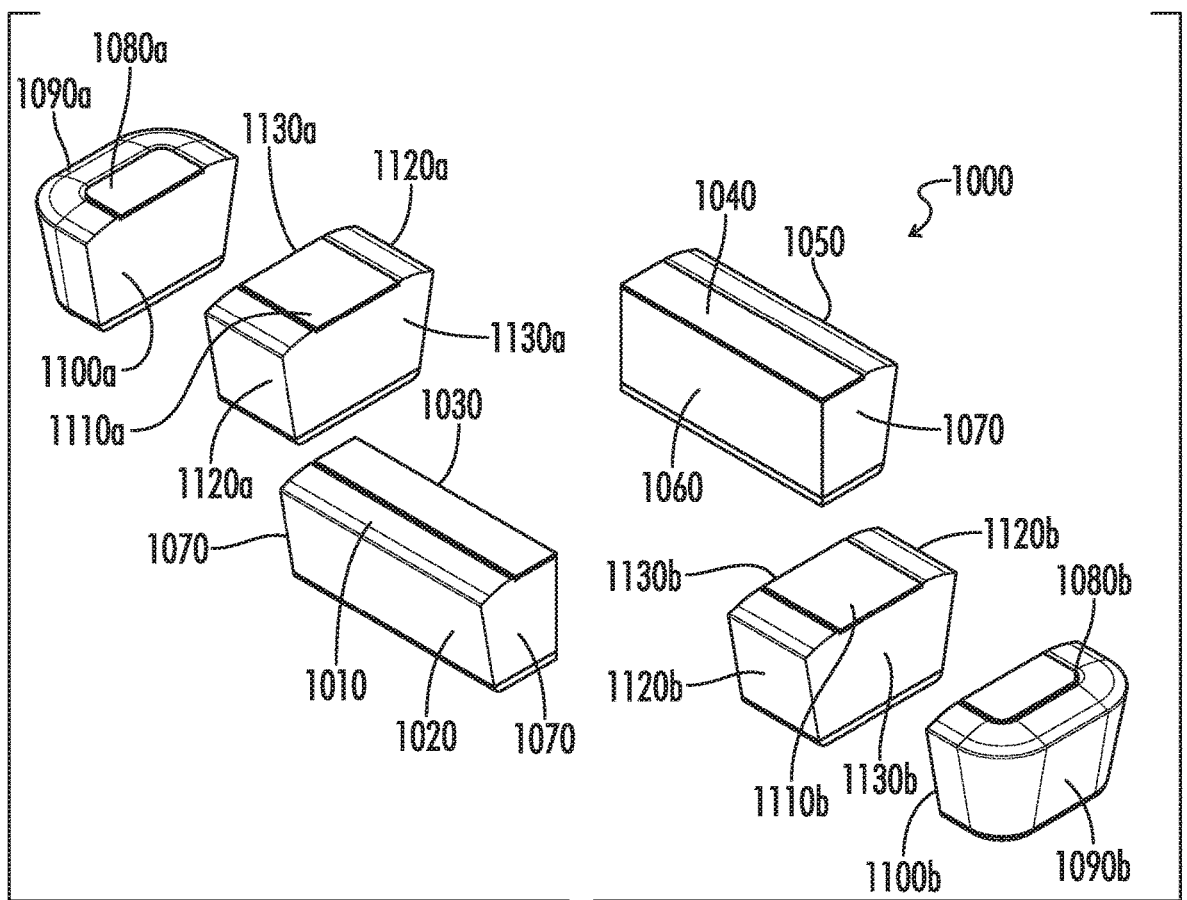
FIG. 12B illustrates the speaker system of FIG. 12A in an exploded view.
Figure 13A:
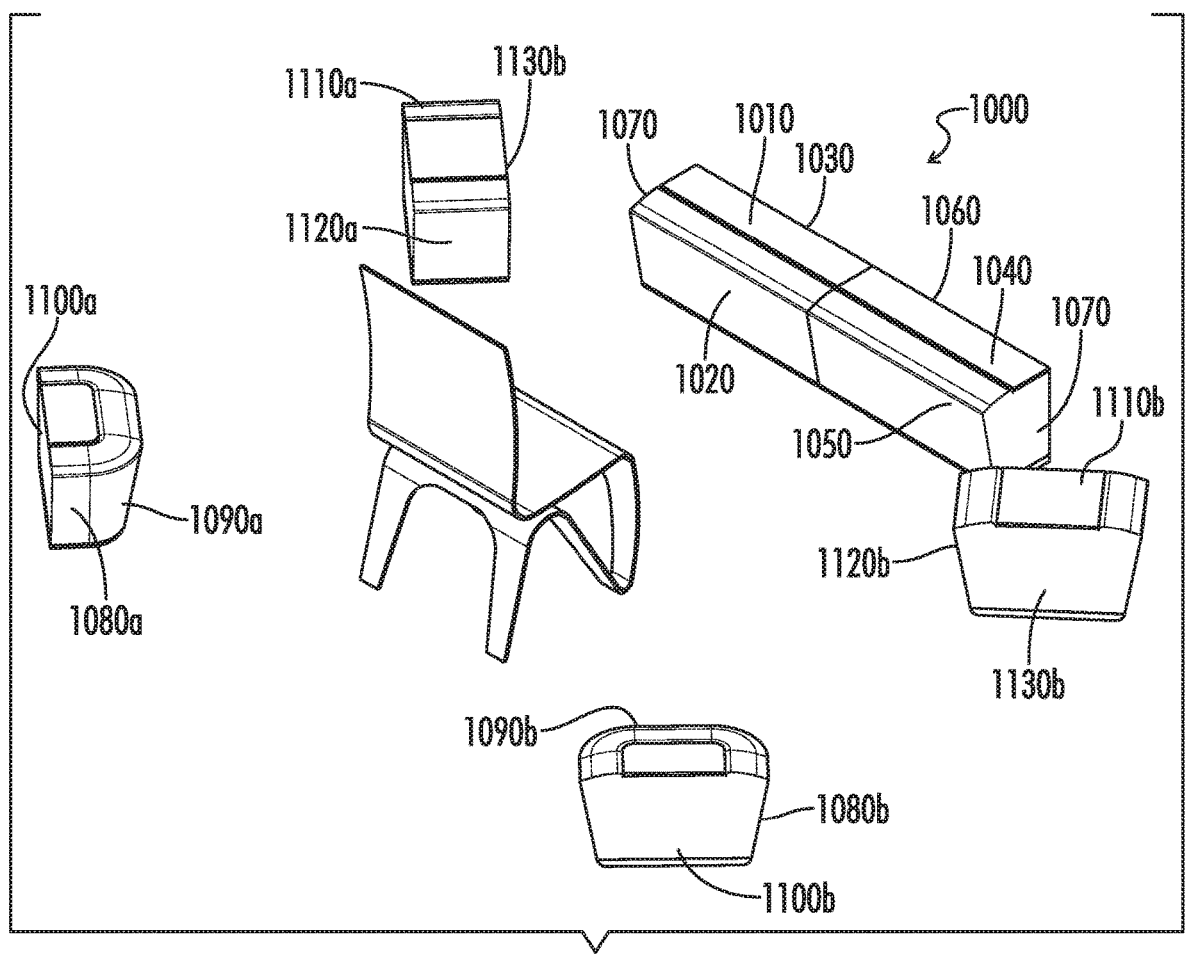
FIG. 13A is a perspective view of the speaker system of FIG. 12A in a second configuration.
Figure 13B:
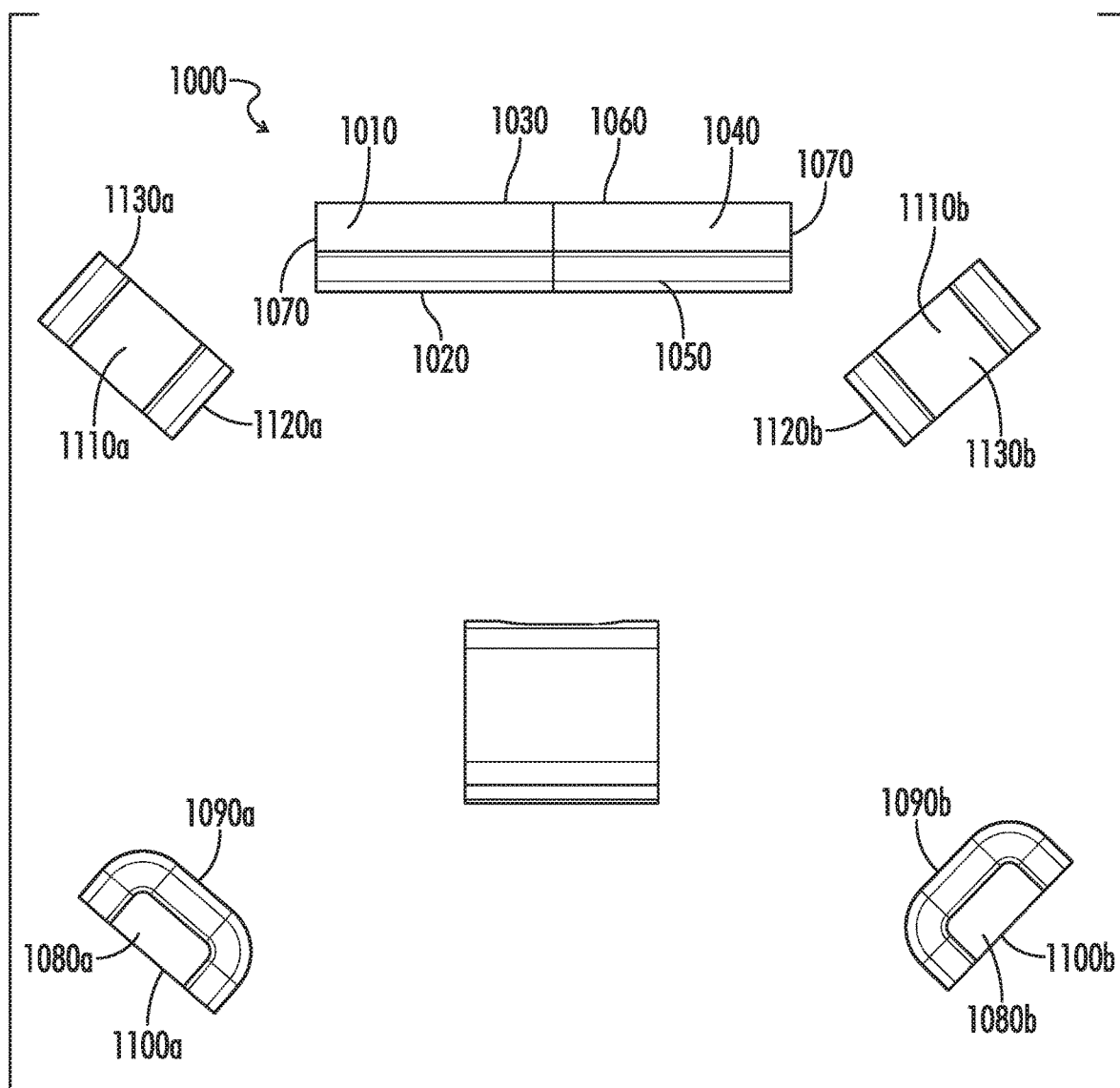
FIG. 13B is an overhead view of the speaker system of FIG. 12A in the second configuration.

As shown, and similar to the system 800 shown in FIG. 8A, the system 1000 typically comprises a primary speaker module 1010 configured to communicate with an external audio device and a secondary speaker module 1040. The primary speaker module 1010 has a speaker output face 1020 and a back surface 1030 opposite the speaker output face and the secondary speaker module 1040 also has a speaker output face 1050 and a back surface 1060. In a first configuration, as shown in FIGS. 10A and 12A, the primary speaker module 1010 and the secondary speaker module 1040 are connected at their respective back surfaces 1030, 1060, such that the primary and secondary speaker modules 1010, 1040 face opposite direction.

In a second configuration, as shown in FIGS. 11A, 11B, 13A, and 13B, the primary and secondary speaker modules 1010, 1040 are side by side and the speaker output faces 1020, 1050 face the same direction. In such a configuration, the primary and secondary speaker modules 1010, 1040 may be connected at side surfaces 1070.

The system 1000 further comprises two tertiary speaker modules 1080a, b, each having corresponding speaker output faces 1090a, b and back surfaces 1100a, b. In the first configuration of the system, those tertiary speaker modules 1080a, b are attached to the primary speaker module 1010 or the secondary speaker module 1040 or an assembly comprising the primary speaker module 1010 and the secondary speaker module 1040. As shown, the tertiary speaker modules 1080a, b may be fixed at a right angle relative to the speaker output faces 1020, 1050 of the primary and secondary speaker modules 1010, 1040.

As discussed above with respect to the system 800 shown in FIG. 8A, all speakers may be in signal communication implemented in a variety of ways, and mechanical or magnetic connectors may be provided to retain the system 1000 in the first configuration. Further, while in the first configuration, as shown in FIGS. 10A and 12A, all speakers 1010, 1040, 1080a, b may output full sound received from an audio source at the primary speaker module 1010.

The system 1000 may further comprise additional speakers, such as quaternary speakers 1110a, b. These may each have one or more speaker output faces 1120a, b, as well as side surfaces 1130a, b. When the system 1000 is in the first configuration, the quaternary speakers 1110a, b may be attached to the primary speaker module 1010 and/or the secondary speaker module 1040, by way of the side surfaces 1130a, b thereby forming an assembly. The tertiary speaker modules 1080a, b may then be fixed to additional side surfaces 1130a, b of the respective quaternary speaker modules 1110a, b. Accordingly, each side surface 1130a, b of the quaternary speaker modules 1110a, b may comprise a connector mechanism, such that it can connect to side surfaces 1070 of the primary or secondary speaker module 1010, 1040 at a first side and to the corresponding back surface 1100a, b, of a tertiary speaker module 1080a, b in the second configuration.

When in the first configuration, all speakers of the system 1010, 1040, 1080a, b, 1110a, b may output full audio sound, and the speaker output faces 1120a, b of the quaternary speaker modules 1110a, b may face the same or similar directions as one or both of the primary and secondary speaker modules 1010, 1040.

In the second configuration, the modules of the system 1000 may be separated such that the primary and secondary speaker modules 1010, 1040 are arranged side by side to form a sound bar, as discussed above. As discussed with respect to the system 800 of FIG. 8A, the modules 1010, 1040 may be connected and/or linked in various ways. The tertiary and quaternary speaker modules 1080*a, b*, 1110*a, b* may then be arranged about a listening space in order to implement a surround sound protocol, as discussed above. In the embodiment shown, the quaternary speaker modules may be configured to output sound from the side surfaces 130*a, b* when in the second configuration, but to output sound from the speaker output faces 1120*a, b* when in the first configuration.

Accordingly, when in the first configuration, each of the primary, secondary, tertiary, and quaternary speaker modules 1010, 1040, 1080*a, b*, 1110*a, b* may output full audio. In the second configuration, all such modules 1010, 1040, 1080*a, b*. 1110*a, b* may be provided with distinct audio channels as controlled by the primary speaker module 1010. Typically, the primary and secondary speaker module 1010, 1040 would each be provided with left or right stereo channels, while the tertiary and quaternary speaker modules 1080*a, b*, 1110*a, b* would each be provided with additional channels other than the basic stereophonic channels.

As shown, the primary and secondary speaker modules 1010, 1040 may be provided with portions of a handle 1150, such that when in the first configuration, the system 1000 may be held by the handle 1150. When in the second configuration, each of the primary and secondary speaker modules 1010, 1040 may be provided with a portion of the handle 1150.

Figure 14:
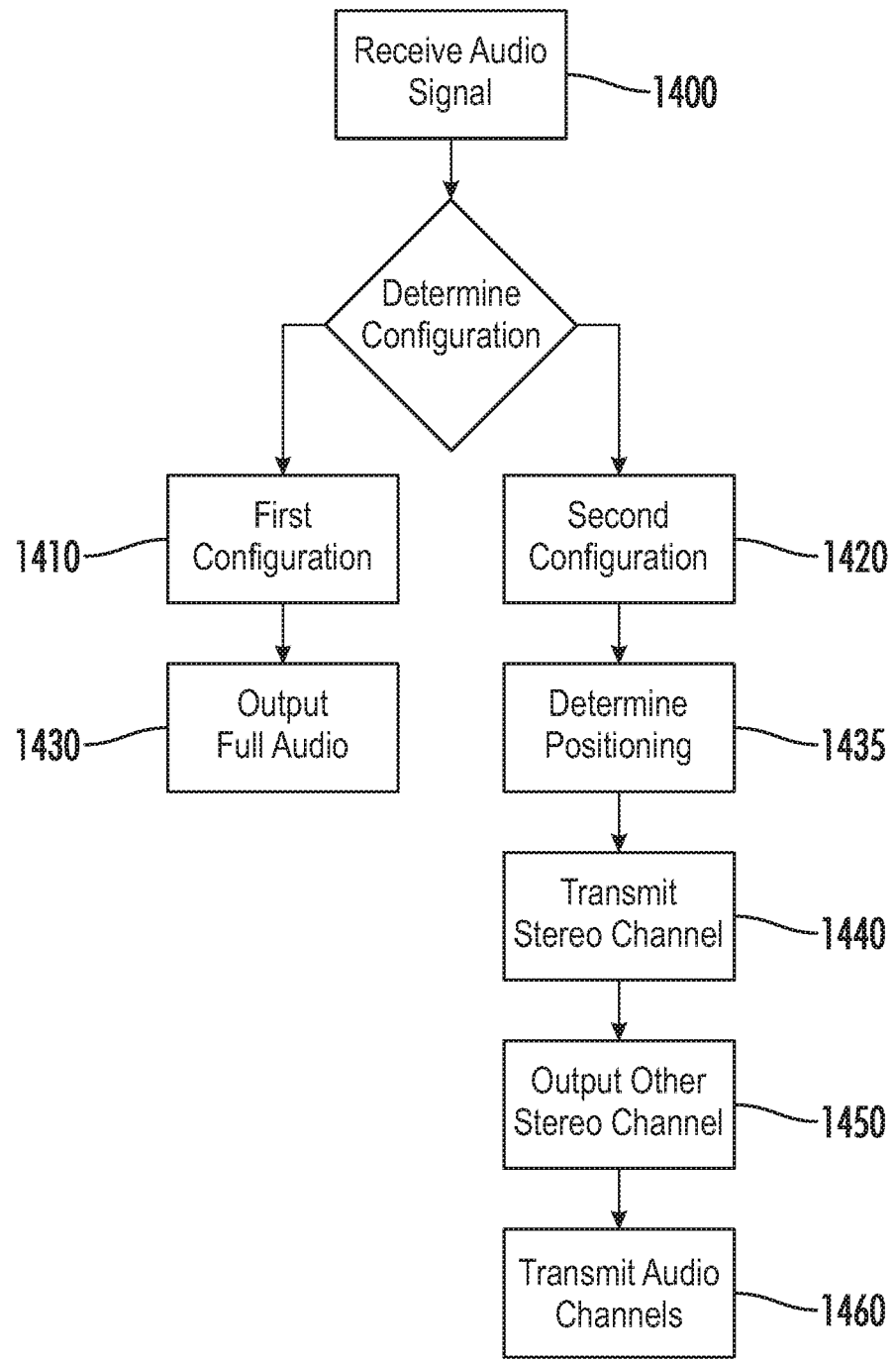
FIG. 14 is a flowchart illustrating a method for broadcasting audio using the speaker system of FIG. 8A FIGS. 15A, 15B, and 15C illustrate an embodiment of a speaker system in accordance with this disclosure in a first configuration.

FIG. 14 is a flowchart illustrating a method for broadcasting audio using the speaker system of one of FIG. 8A, 10A, or 12A. As shown, during normal use, the primary speaker module 810 of the speaker system 800 receives a signal communication from an external audio device (1400). The signal may be received by way of a traditional line-in audio jack, or it may be received by way of a wireless protocol, such as Bluetooth. In embodiments implementing surround sound protocols, more sophisticated audio inputs may be provided for receiving multiple channels of audio.

Once received, or prior to receiving the audio signal, the primary speaker module 810 may determine whether the speaker system is in a first configuration (1410) in which the speaker system 800 is retained as a single unit, or in a second configuration (1420) in which the speaker modules 810, 840, 880*a, b* are separated.

If the system 800 is determined to be in the first configuration (at 1410), the primary speaker module 810 transmits whole, or full, audio to each speaker module (1430), including the secondary speaker module 840 and any tertiary speaker modules 880*a, b*.

If the system 800 is determined to be in the second configuration (at 1420), the primary speaker module 810 transmits one of left or right stereo audio to the secondary speaker module 810 (1440) and outputs the other of the left or right stereo audio at its own speaker output face 820 (1450). Further, the primary speaker module 810 typically transmits audio channels other than the left or right stereo audio to each of the tertiary speaker modules 880*a, b* (1460). In some embodiments, distinct audio channels are transmitted to each of the tertiary speaker modules 880*a, b*, and the channels transmitted may be in accordance with a standard surround sound protocol selected by a user.

In some embodiments, once the system 800 is determined to be in the second configuration, the primary speaker module 810 may determine the relative location of the secondary and tertiary speaker modules 840, 880*a, b* (at 1435) and may transmit appropriate channels on that basis. Alternatively, a user may program the primary speaker module 810 to transmit appropriate channels. Such programming may be by way of a user interface on the primary speaker module 810, or by way of a software application accessible at a different user interface device, such as a smartphone.

Figure 15A:
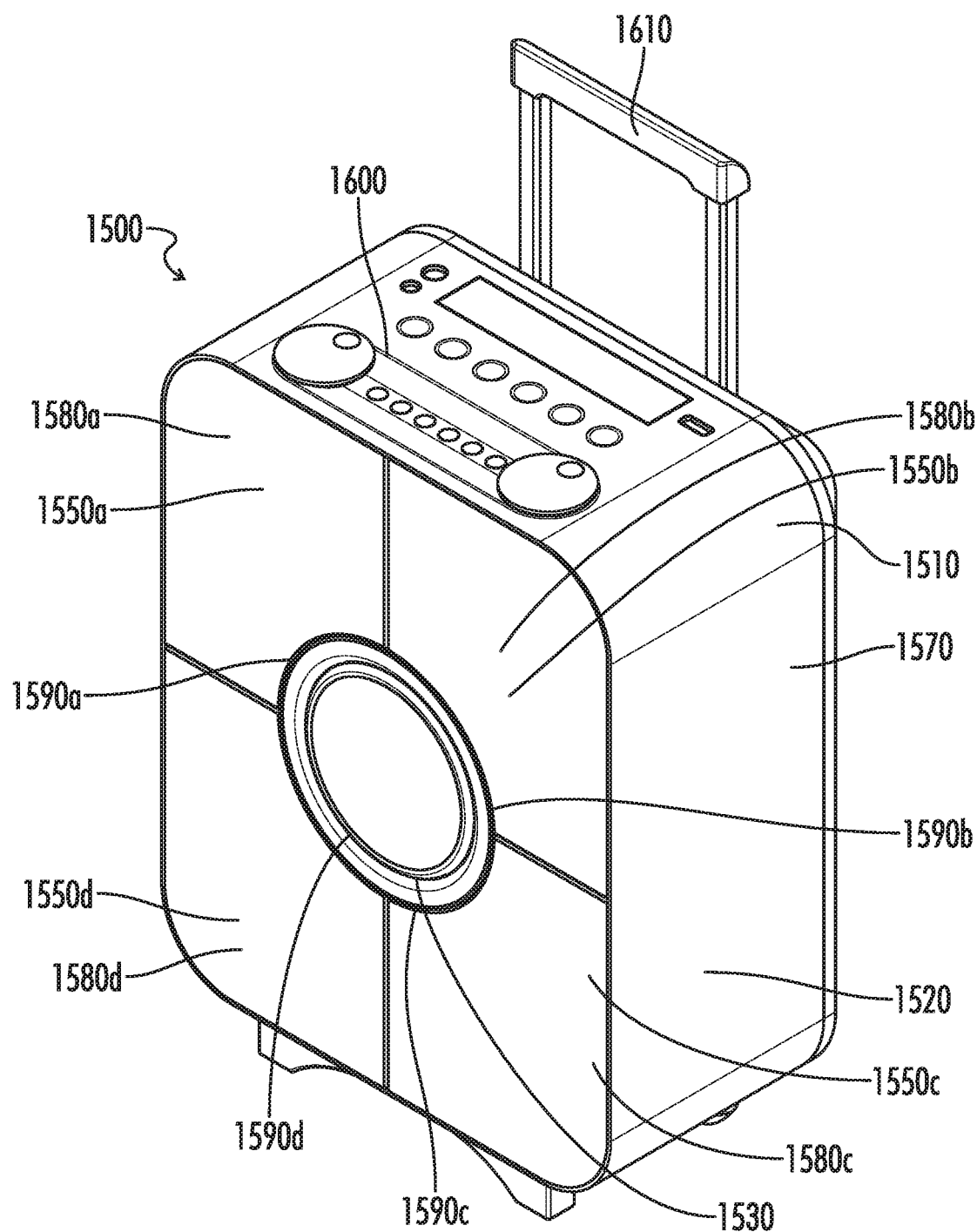
Figure 15B:
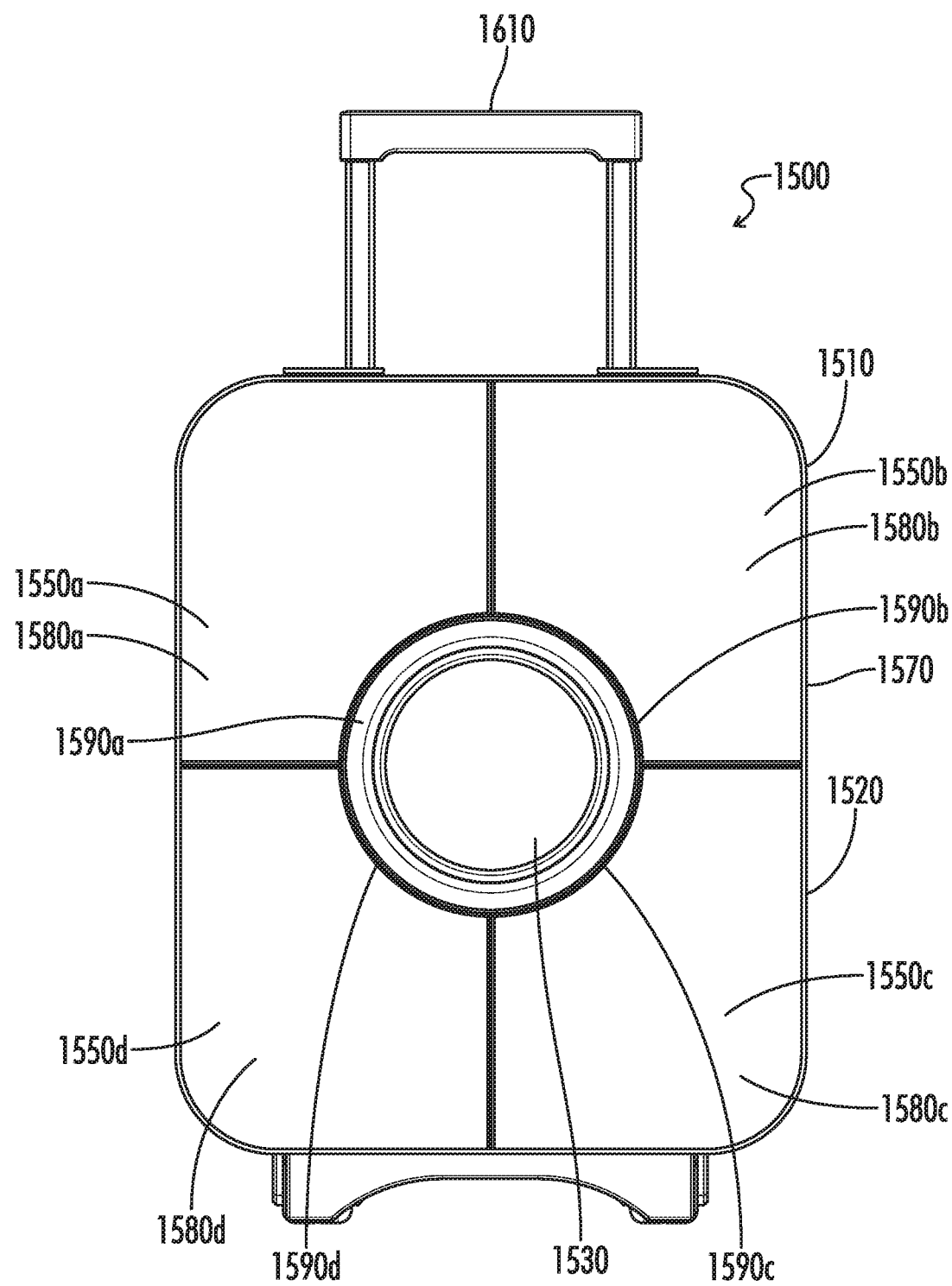
Figure 15C:
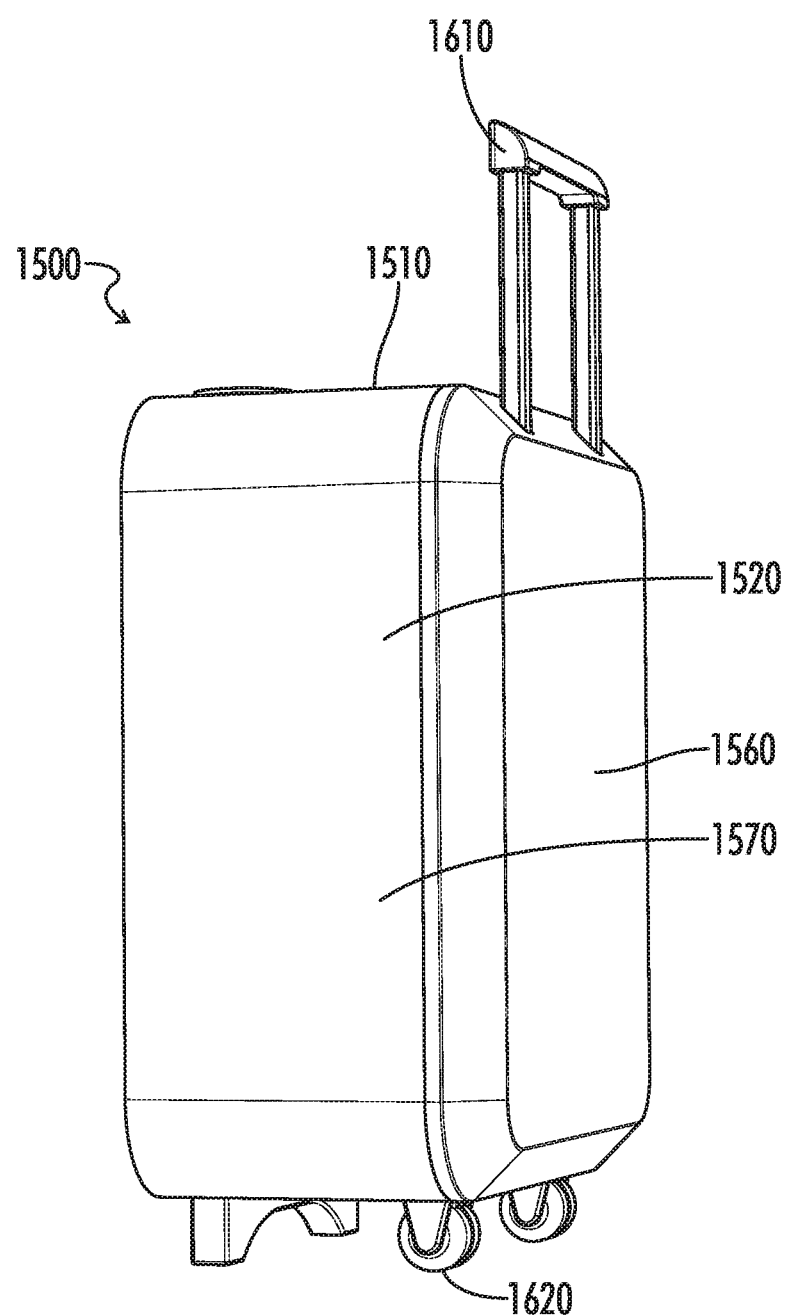
Figure 16:
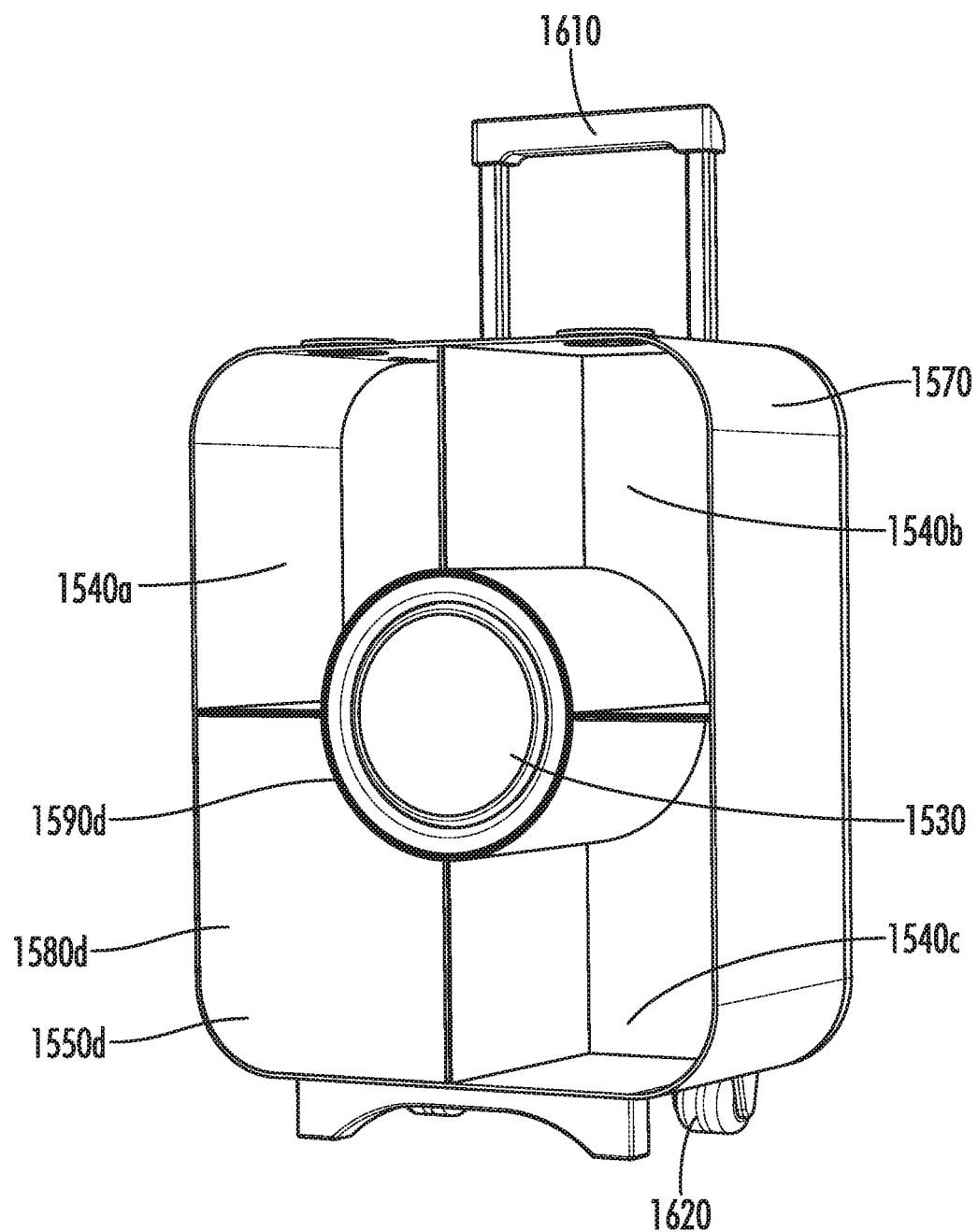
FIG. 16 illustrates some components of the speaker system of FIG. 15A is a second configuration.
Figure 17:
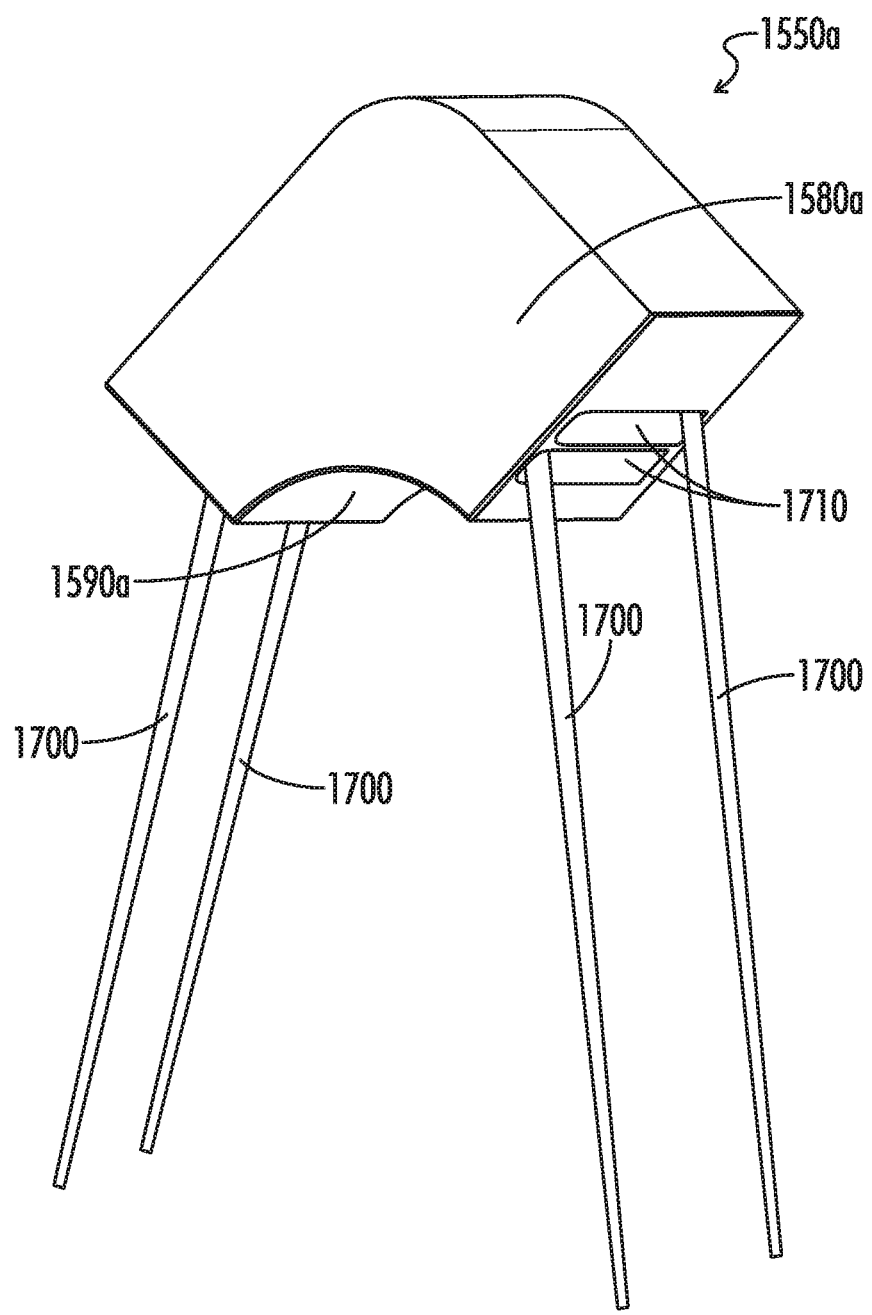
FIG. 17 illustrates a speaker of the speaker system of FIG. 15A in a second configuration.

FIGS. 15A, 15B, and 15C illustrate an embodiment of a speaker system 1500 in accordance with this disclosure in a first configuration. FIG. 16 illustrates some components of the speaker system of FIG. 15A is a second configuration, and FIG. 17 illustrates a speaker module of the speaker system of FIG. 15A in a second configuration.

Figure 18:
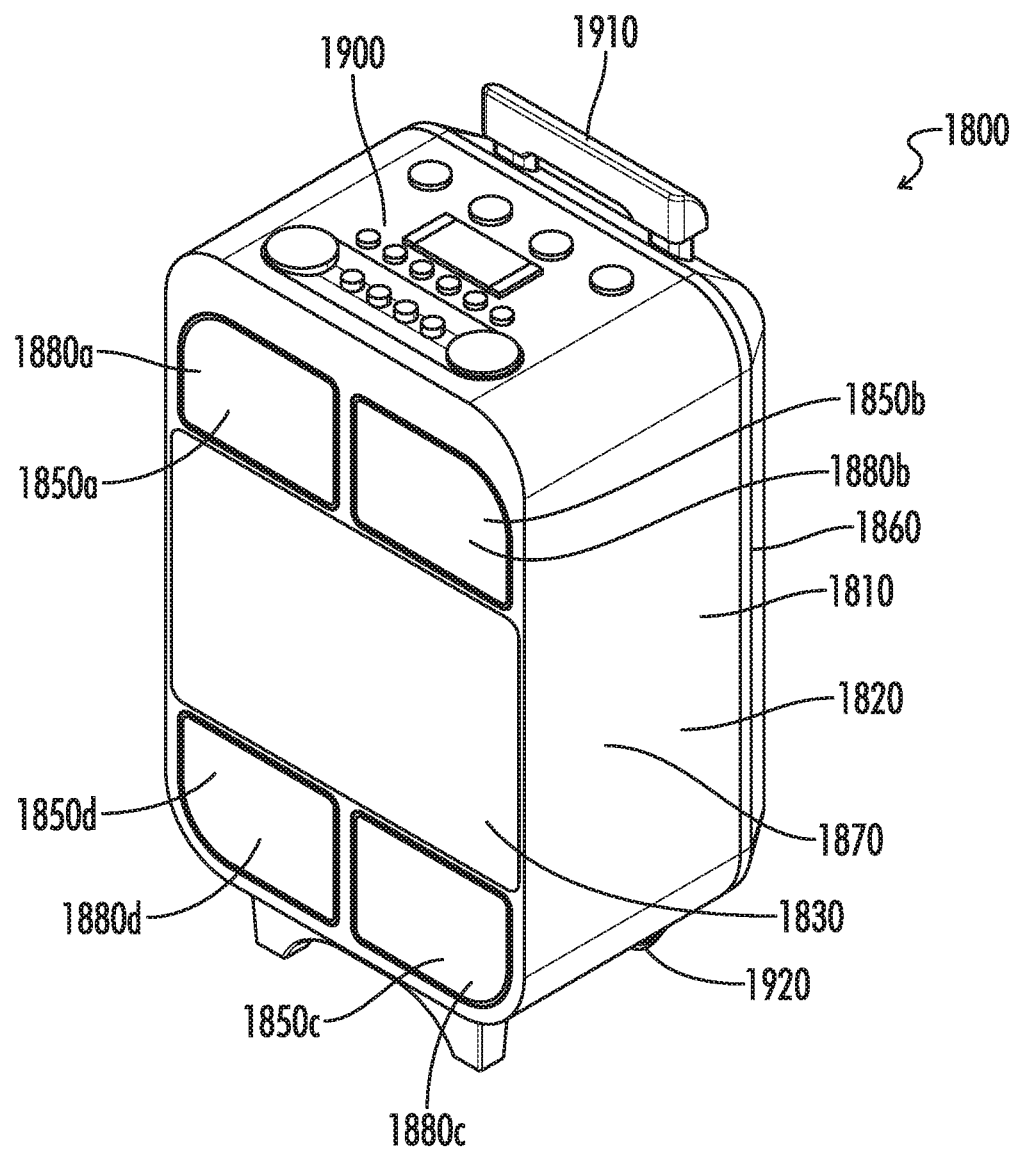
FIG. 18 illustrates an embodiment of a speaker system in accordance with this disclosure in a first configuration.
Figure 19:
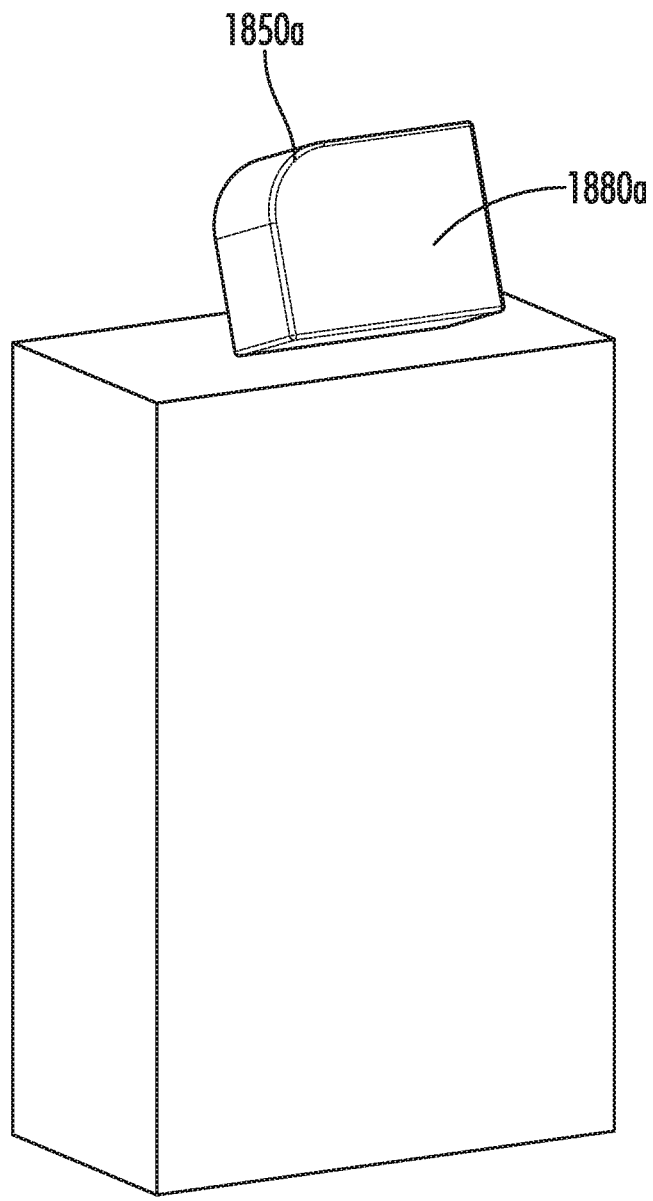
FIG. 19 illustrates a variation of a speaker of the speaker system of FIG. 18 in a second configuration.
Figure 20:
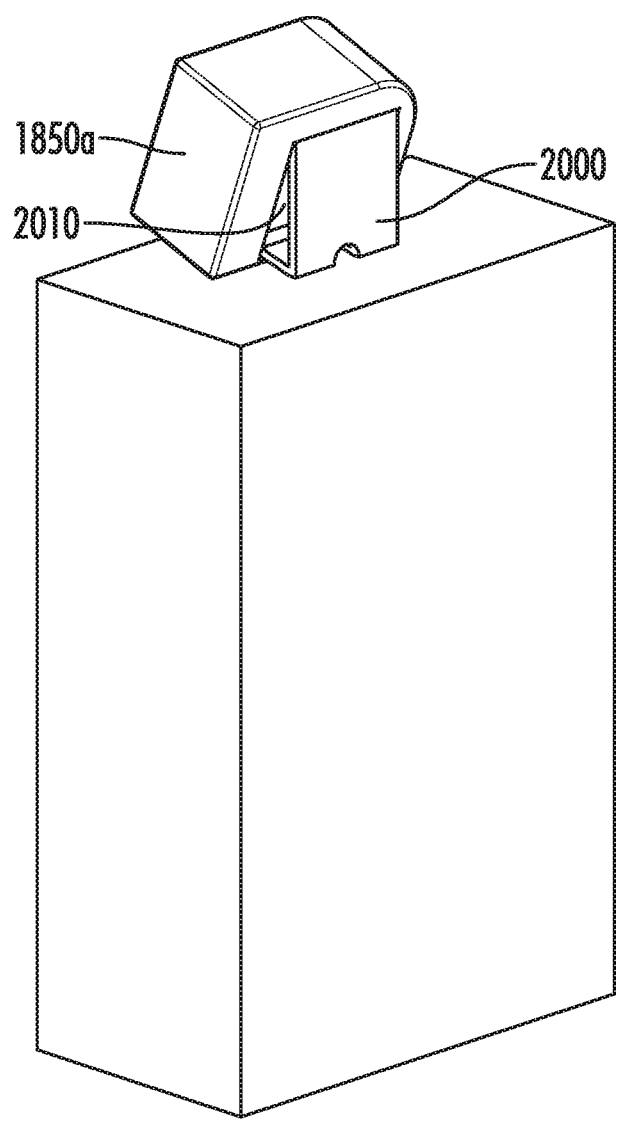
FIG. 20 provides a back view of the speaker of FIG. 19.
Figure 21A:
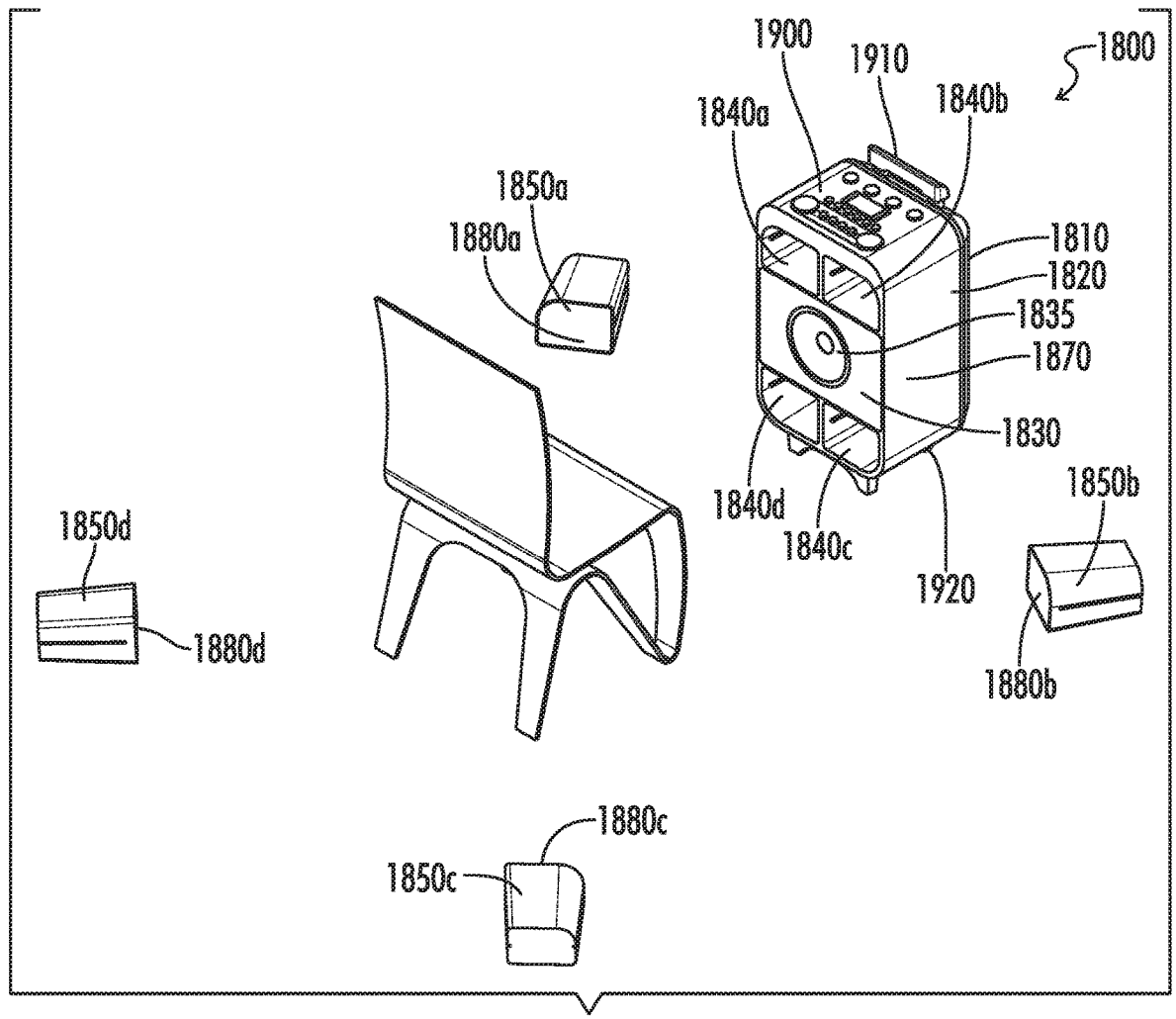
FIGS. 21A and 21B illustrate the speaker system of FIG. 18 in a second configuration.
Figure 21B:
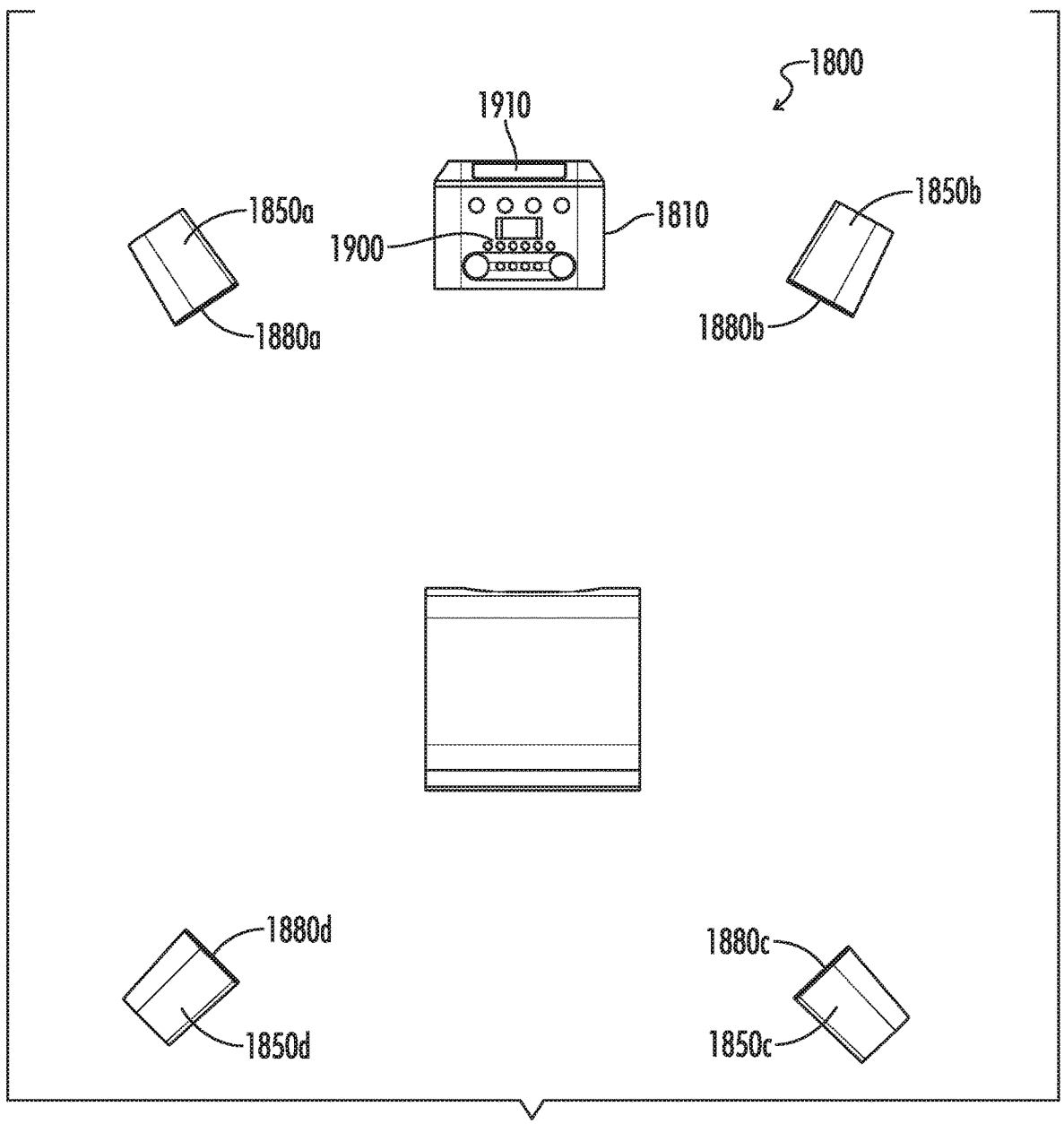

FIG. 18 illustrates an alternative embodiment similar to that of FIG. 15A in a first configuration, FIGS. 19 and 20 illustrate a speaker of the speaker system of FIG. 18 in a second configuration, and FIG. 21 illustrates the speaker system of FIG. 18 in the second configuration.

As shown in FIG. 15, a primary speaker module 1510 is provided having a housing 1520, a speaker component 1530 within the housing, and a storage location 1540 within the housing. The primary speaker module 1510 also has an interface for receiving an audio signal to be output and an output module for broadcasting audio to secondary speaker modules 1550*a, b, c, d*.

Accordingly the speaker system 1500 also has a plurality of secondary speaker modules 1550*a, b, c, d* removably located within the storage location 1540 of the primary speaker module 1510. Each of the secondary speaker modules 1550*a, b, c, d* has an input module for receiving audio broadcasted from the output module of the primary speaker module 1510. When the speaker system 1500 is in a first configuration, shown in FIGS. 15A, 15B, and 15C, all secondary speaker modules 1550*a, b, c, d* are stored in the storage location 1540. When the speaker system 1500 is in the second configuration, as shown in FIGS. 16 and 17, the secondary speaker modules 1550*a, b, c, d* are removed and located about a listening space.

The housing 1520 of the primary speaker module 1510 has a back wall 1560 and side walls 1570 and an open front face defining the storage location 1540. Accordingly, the secondary speaker modules 1550*a, b, c, d* are placed in the storage location 1540 by way of the open front face. As shown, the speaker component 1530 of the primary speaker module 1510 may be centrally located within the housing 1520, and may therefore be encircled by the storage location 1540. When the secondary speaker modules 1550*a, b, c, d* are located within the storage location 1540, they therefore surround the speaker component 1530.

Each of the secondary speaker modules 1550*a, b, c, d* has a speaker output face 1580*a, b, c, d*, and when the secondary speaker modules are stored in the storage location 1540, the corresponding speaker output face faces outwards towards the open front face of the housing 1520. As such, when stored and in the first configuration, audio played by all four secondary speaker modules 1550*a, b, c, d* as well as the speaker component 1530 is output from a front surface of the primary speaker module 1510. Accordingly, in the first configuration, all speaker modules 1550*a, b, c, d* and speaker components 1530 output full audio. In the second configuration, with the secondary speaker modules 1550*a, b, c, d* removed and arranged about a listening space, each speaker may be provided with a distinct audio components, such as left or right stereo channels, or different audio channel, such that the system 1500 outputs surround sound audio.

In some embodiments, each of the secondary speaker modules 1550*a, b, c, d* represent a traditional speaker, while the speaker component 1530 of the primary speaker module 1510 is a subwoofer or other type of bass speaker. In some embodiments, only 3 secondary speaker modules are provided, and a fourth unit remains fixed in the primary speaker module 1510. In such an embodiment, the primary speaker module 1510 may have a speaker and a subwoofer built in.

The primary speaker module 1510 may further comprise an audio receiving module, as discussed above with respect to other speaker systems 800, 1000 in order to receive audio from an external audio source. This may be, for example, a line in connection, a radio broadcast receiver module, or some other type of wireless connection.

The primary speaker module 1510 may further be provided with a control interface 1600 for controlling the audio output of the system 1500. The control interface 1600 may control the system as a whole, as well as the individual secondary speaker modules 1550*a, b, c, d*. Accordingly, when in the second configuration, the control interface 1600 may be used to coordinate surround sound output of the system as a whole.

The primary speaker module 1510 is typically configured to easily transport the entire system 1500 while in its first configuration. Accordingly, the primary speaker module may be further provided with a handle 1610 and wheels 1620 for rolling the system 1500 as baggage.

FIG. 17 shows one secondary speaker module 1550*a*. As shown, the secondary speaker module 1850*a*, once removed from the primary speaker module 1510, may be substantially rectangular when viewed from the speaker output face 1580*a*. The secondary speaker module 1550*a* may therefore have a rounded outer corner to conform to a curve of the side walls 1570 of the housing 1520 of the primary speaker module 1510. The secondary speaker module 1550*a* may further have an arcuate segment 1590*a* removed from an inner corner, such that it may surround the speaker component 1530 of the primary speaker module when in the first configuration.

Accordingly, when all four secondary speaker modules 1550*a, b, c, d* are stored in the storage location 1540, the arcuate segments 1590*a, b, c, d* of all four modules may combine to form a circle surrounding the speaker component 1530 of the primary speaker module.

In some embodiments, the storage location 1540 is subdivided to provide distinct storage compartments for each of the secondary speaker modules 1550*a, b, c, d*. Such an embodiment is shown below and discussed with reference to FIGS. 18-21. In other embodiments, a single open storage location 1540 is provided, and the secondary speaker modules 1550*a, b, c, d* are braced against each other when in storage in the first configuration.

As shown in FIG. 17, the secondary speaker module 1550*a* may have a support element 1700 for spacing the speaker module apart from the ground. The support element may be one or more legs, for example, and it may be collapsible such that it can be collapsed, folded, and stored within the corresponding secondary speaker module 1550*a* at a corresponding storage location 1710. As shown, the support element 1700 may comprise four independent legs, and in such an embodiment, each leg may be provided with a distinct storage location 1710.

Accordingly, in transitioning the system 1500 from the first configuration, shown in FIGS. 15A, 15B, and 15C, to the second configuration shown in FIGS. 16 and 17, each of the four secondary speaker modules 1550*a, b, c, d* may be removed from the storage location 1540, and the corresponding legs may be opened and expanded such that the corresponding speaker module can be properly positioned. The control interface 1600 on the primary speaker module 1510 may then be used to coordinate the output of the speaker component 1530 and the secondary speaker modules 1550*a, b, c, d*.

Typically, each of the primary speaker module 1510 and the secondary speaker modules 1550*a, b, c, d* are provided with a battery, such that the system 1500 is portable. The primary speaker module 1510 may be provided with electrical contacts for charging the secondary speaker modules 1550*a, b, c, d* in the back wall 1560 of the housing 1520. In this way, the secondary speaker modules 1550*a, b, c, d* may be provided with corresponding electrical contacts such that their corresponding batteries are charged when the modules are located in the storage location 1540. The secondary speaker modules 1550*a, b, c, d* may charge when the primary speaker module 1510 is plugged into a power source, such that all modules charge at the same time. Alternatively, or in combination with such a schematic, the primary speaker module 1510 may be provided with a larger battery than the secondary speaker modules 1550*a, b, c, d*, such that the primary speaker module may be used to recharge the secondary speaker modules even when not connected to a power source.

FIGS. 18-21 illustrate an alternative embodiment 1800 of the speaker system discussed with respect to FIG. 15A. As shown in FIG. 18, a primary speaker module 1810 is provided having a housing 1820, a speaker component 1830 within the housing, and discrete storage locations 1840*a, b, c, d* within the housing. The system 1800 further comprises four secondary speaker modules 1850*a, b, c, d* that may be stored within the corresponding discrete storage locations 1840*a, b, c, d*. The primary speaker module 1810 has an interface for receiving an audio signal to be output and an output module for broadcasting audio to the secondary speaker modules 1850*a, b, c, d*.

Accordingly, in a first configuration, shown in FIG. 18, the speaker system 1800 has the secondary speaker modules 1850*a, b, c, d* removably located within the corresponding storage locations 1840*a, b, c, d*. Each secondary speaker module has an input module for receiving audio broadcasted from the output module of the primary speaker module 1810. When the speaker system 1800 is in a second configuration, shown in FIGS. 19-21, the secondary speaker modules 1850*a, b, c, d* are removed from the corresponding storage locations 1840*a, b, c, d*, and are located about a listening space.

The housing 1820 of the primary speaker module 1810 has a back wall 1860 and side walls 1870 and a plurality of open spaces defining the storage locations 1840*a, b, c, d* within the side walls. The secondary speaker modules 1850*a, b, c, d*, are placed in the corresponding discrete storage locations 1840*a, b, c, d* by way of the open front face. As shown, the speaker component 1830 of the primary speaker module 1810 may be centrally located within the housing 1820 and the secondary speaker modules 1850*a, b, c, d*, may therefore partially surround the primary speaker module 1810 when the system 1800 is in the first configuration.

Each of the secondary speaker modules 1850*a, b, c, d* has a speaker output face 1880*a, b, c, d*, and when the secondary speaker modules are stored in the corresponding storage locations 1840*a, b, c, d*, they are stored such that the corresponding speaker output faces face the open front face of the housing 1820. As such, when stored and in the first configuration, the audio played by all four secondary speaker modules 1850*a, b, c, d* as well as the speaker component 1830 is output from a front surface of the primary speaker module 1810.

In such an embodiment, in the first configuration, all speaker modules 1850*a, b, c, d* and speaker components 1830 output full audio. In the second configuration, with the secondary speaker modules 1850*a, b, c, d* removed and arranged about a listening space, each speaker may be provided with distinct audio components, such as left or right stereo channels, or different audio channels, such that the system 1800 outputs surround sound audio.

In some embodiments, each of the secondary speaker modules 1850*a, b, c, d* represent a traditional speaker, while the speaker component 1830 of the primary speaker module 1810 is a subwoofer or other type of bass speaker. In other embodiments, the speaker component 1830 of the primary speaker module 1810 comprises a subwoofer component 1835 in combination with one or more traditional speaker components.

The primary speaker module 1810, as discussed above with respect to other speaker systems 800, 1000, 1500, may comprise an audio receiving module in order to receive audio from an external audio source. This may be, for example, a line in connection, a radio broadcast receiving module, or some other type of wireless connection. The primary speaker module 1810 may further be provided with a control interface 1900 for controlling the audio output of the system 1800. The control interface 1900 may control the system as a whole, as well as the individual speaker modules 1850*a, b, c, d*. Accordingly, when in the second configuration, the control interface 1900 may be used to coordinate surround sound output of the system as a whole.

The primary speaker module 1810 is typically configured to easily transport the entire system 1800 while in its first configuration. Accordingly, the primary speaker module may be further provided with a handle 1910 and wheels 1920 for rolling the system 1800 as baggage.

FIGS. 19 and 20 show two views of a single secondary speaker module 1850*a* removed from the primary speaker module 1810 and in the second configuration.

As shown, the secondary speaker module 1850*a*, once removed from the primary speaker module 1810, may be substantially rectangular when viewed from the speaker output face 1880*a*. The secondary speaker module 1850*a* may have a rounded corner to conform to a curve of the side walls 1870 of the housing 1820 of the primary speaker module 1810. As shown in FIG. 20, the secondary speaker module 1850 may have a support element 2000 for spacing the speaker module apart from the ground or to maintain the speaker module in a functional configuration, such as by angling the speaker towards a user. The support element may be, for example, a stand, and it may be storable within a corresponding storage location 2010 within the secondary speaker module 1850*a*.

Accordingly, in transitioning the system 1800 from the first configuration, shown in FIG. 18, to the second configuration shown in part in FIGS. 21A, B, each of the four secondary speaker modules 1850*a, b, c, d* may be removed from their respective storage locations 1840*a, b, c, d* and the corresponding support elements 2000*a, b, c, d* may be removed from their respective storage locations 2010*a, b, c, d* and expanded such that the corresponding speaker module can be properly positioned. The control interface 1900 on the primary speaker module 1810 may then be used to coordinate the output of the speaker component 1830 and the secondary speaker modules 1850*a, b, c, d*.

Typically, as in the system 1500 discussed above, each of the primary speaker module 1810 and the secondary speaker modules 1850*a, b, c, d* are provided with a battery such that they overall system 1800 is portable. The primary speaker module 1810 may be provided with electrical contacts for charging each of the secondary speaker modules 1850*a, b, c, d* within the back wall 1860 of the housing 1820. In this way, the secondary speaker modules 1850*a, b, c, d* may be provided with corresponding electrical contacts, such that the secondary speaker modules are charged when in their corresponding storage locations 1840*a, b, c, d*. The secondary speaker modules 1850*a, b, c, d* may all charge when the primary speaker module 1810 is plugged into a power source, such that all modules charge at the same time. Alternatively, or in combination with such a charging scheme, the primary speaker module 1810 may be provided with a larger battery than the secondary speaker modules 1850*a, b, c, d* such that the primary speaker module may be used to charge the secondary speaker modules even when not connected to a power source.

The above merely illustrates the principles of the invention. It is thus appreciated that those skilled in the art will be able to devise various arrangements, which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A speaker system, comprising:
   a primary speaker module configured to communicate with an external audio device and having a speaker output face and a back surface, and
   a secondary speaker module in signal communication with the primary speaker module and having a speaker output face and a back surface,
   wherein the primary speaker module and the secondary speaker module combine in a first configuration in which the primary speaker module and the secondary speaker module are connected at their back surfaces and their respective speaker output faces face opposite directions, and a second configuration in which the primary speaker module and the secondary speaker module are side by side and their respective speaker output faces face substantially the same direction, and
   wherein when the primary speaker module and the secondary speaker module are in the first configuration, each speaker module outputs full sound, and when the primary speaker module and the secondary speaker module are in the second configuration, a first of the speaker modules outputs left stereo sound and a second of the speaker modules outputs right stereo sound.

2. The speaker system of claim 1, wherein the primary speaker module has a first connector on its back surface for connecting the primary speaker module to the secondary speaker module in the first configuration and a second connector on a side surface for connecting the primary speaker module to the secondary speaker module in the second configuration.

3. The speaker system of claim 2 further comprising a plurality of tertiary speaker modules, wherein the tertiary speaker modules are each attached to the primary speaker module or the at least one secondary speaker module in the first configuration, and wherein the tertiary speaker modules are in wireless signal communication with the primary speaker module in the second configuration.

4. The speaker system of claim 3, wherein in the first configuration, the tertiary speaker modules each outputs full sound, and in the second configuration, the tertiary speaker modules each provide an audio channel for a surround sound system other than the left stereo and right stereo channels.

5. The speaker system of claim 3, wherein in the first configuration, one of the tertiary speaker modules connects to the primary speaker module by way of the second connector.

6. The speaker system of claim 3, wherein in the first configuration, the tertiary speaker modules face opposite directions and are each at a substantially right angle relative to the primary speaker module and the secondary speaker module, such that speaker modules face at least four distinct directions.

7. The speaker system of claim 3 further comprising a plurality of quaternary speaker modules, each quaternary speaker module attached to one of the tertiary speaker modules in the first configuration, and wherein the quaternary speaker modules are in wireless signal communication with the primary speaker module in the second configuration.

8. The speaker system of claim 7, wherein in the first configuration, the secondary and quaternary speaker modules each outputs full sound, and in the second configuration, the tertiary speaker modules and the quaternary speaker modules each provide an audio channel for a surround sound system other than the left stereo and the right stereo channels.

9. The speaker system of claim 3, wherein the tertiary speaker modules are connected to the primary speaker module by way of the second connector and a third connector when in the first configuration, and wherein each of the secondary and tertiary speaker modules comprise batteries, and wherein the first connector, second connector, and third connector, each comprise an electrical connection such that the batteries can charge by way of the corresponding connectors.

10. The speaker system of claim 2, wherein each of the primary speaker module and the secondary speaker module comprise batteries, and wherein the first connector comprises an electrical connection, such that the battery of the secondary speaker module can charge by way of the first connector.

11. The speaker system of claim 1, wherein the first connector and the second connector are magnetic connectors.

12. The speaker system of claim 1, wherein in the second configuration, the primary speaker module and the secondary speaker module are spaced apart from each other.

13. The speaker system of claim 1, wherein the primary speaker module is configured to communicate with an external audio device through one of a line in connection and a wireless connection.

14. The speaker system of claim 1, wherein the primary speaker module comprises audio controls and the secondary speaker module does not comprise audio controls.

15. The speaker system of claim 1, wherein each of the primary and secondary speaker modules further comprise a subwoofer component.

16. A method for broadcasting audio through a speaker system, comprising:
receiving signal communication from an external audio device at a primary speaker module;
determining if the speaker system is in a first or second of two configurations;
if the speaker system is determined to be in the first configuration,
transmitting whole audio to a secondary speaker module; and
outputting whole audio at the primary speaker module; and
if the speaker system is determined to be in the second configuration,
transmitting one of left stereo or right stereo audio to the secondary speaker module; and
outputting the other of left stereo or right stereo audio at the primary speaker module,
wherein the first configuration comprises the primary speaker module and the secondary speaker module positioned back to back and facing opposite directions.

17. The method for broadcasting audio of claim 16, further comprising:
if the speaker system is determined to be in the first configuration, transmitting whole audio to a plurality of tertiary speaker modules; and
if the speaker system is determined to be in the second configuration, transmitting a plurality of audio channels other than right stereo and left stereo to the plurality of tertiary speaker modules respectively.

18. A speaker module, comprising:
a power button;
volume controls;
a first connector;
a second connector;
a front surface containing a speaker output;
a transceiver configured to pair the speaker module with an external device to receive audio; and
an output module for broadcasting audio received from the device;
wherein the first connector is on a back surface opposite the front surface, and wherein the second connector is on a side surface adjacent the front surface.

19. The speaker of claim 18, wherein the output module broadcasts audio from the speaker module to a secondary speaker module, and wherein when the secondary speaker module is fixed to the first connector, the speaker module outputs full sound, and wherein when the secondary speaker is fixed to the second connector or is connected only wirelessly to the speaker module, the speaker module outputs one of left and right stereo sound and the output module broadcasts the other of left and right stereo sound.

20. The speaker of claim 18, wherein the transceiver is configured to scan for an external device, wherein the external device broadcasts audio received at the transceiver.

* * * * *